United States Patent [19]
Gopher et al.

[11] Patent Number: 5,493,654
[45] Date of Patent: Feb. 20, 1996

[54] CHORDIC KEYBOARD SYSTEM FOR GENERATING A SIGNAL IN RESPONSE TO A CHORD THAT IS ASSIGNED USING A CORRELATION BASED ON A COMPOSITE CHORD-DIFFICULTY INDEX

[75] Inventors: Daniel Gopher, Haifa, Israel; John Hilburn; David Vicknair, both of Baton Rouge, La.

[73] Assignee: Infogrip, Inc., Ventura, Calif.

[21] Appl. No.: 288,220

[22] Filed: Aug. 9, 1994

Related U.S. Application Data

[63] Continuation of Ser. No. 722,326, Jun. 28, 1991, abandoned.

[51] Int. Cl.⁶ ............................................. G06F 3/02
[52] U.S. Cl. .................. 341/22; 364/234; 364/DIG. 1; 400/486; 400/489; 395/161; 395/893
[58] Field of Search .................... 395/375, 275; 400/486, 489; 341/22; 364/234

[56] References Cited

U.S. PATENT DOCUMENTS

| | | |
|---|---|---|
| 2,319,273 | 5/1943 | Sterling . |
| 2,387,330 | 10/1945 | Johnson et al. . |
| 2,393,781 | 1/1946 | Johnson et al. . |

(List continued on next page.)

FOREIGN PATENT DOCUMENTS

| | | |
|---|---|---|
| 0085645 | 8/1983 | European Pat. Off. . |
| 0279553 | 8/1988 | European Pat. Off. . |
| 2064187 | 6/1981 | United Kingdom . |

OTHER PUBLICATIONS

David Raij et al., "Perceptual And Motor Determinants Of Efficient Data Entry," Proceedings Of The Human Factors Society, 31st Annual Meeting, 1987, pp. 820–824.
M. Gladwell, "Redesigning Illogical Keyboards," The Washington Post, Science Section, Sep. 18, 199.
S. Owen, "Qwerty is Obsolete," Interface Age, Jan. 1978, p. 56.
J. Jedamus & G. Wheelwright, "Designing a Speedier Keyboard," Newsweek, May 12, 1986, p. 3.
S. Dillingham, "Pressured Wrists Get Redesigned Keyboard," Insight On the News, Nov. 28, 1988, p. 45.
"Death of the Qwerty Keyboard," Design World, No. 8, 1985, pp. 36–43.
P. K. C. Maher & H. V. Bell, "The Man Machine Interface—A New Approach," 1976, pp. 122–125.
"A Computer in Every Hand," The Economist, Nov. 26, 1988, p. 76.

(List continued on next page.)

*Primary Examiner*—Alyssa H. Bowler
*Assistant Examiner*—John Harrity
*Attorney, Agent, or Firm*—Finnegan, Henderson, Farabow, Garrett & Dunner

[57] ABSTRACT

A chordic keyboard system for communicating with a data processing system. The chordic keyboard system includes ergonomic features, i.e., a keyboard that is tilted and an integrated palm rest. The chordic keyboard system also includes data entry features, i.e., storage for data representative of a plurality of chords, each chord corresponding to a subset of the plurality of keys of the chordic keyboard, and for a plurality of symbols, each data representative of a chord represented by and corresponding to one of the plurality of symbols according to a frequency-of-use index of the symbol and further according to a correlation based on a chord-difficulty index of the chord. The plurality of groups includes an alphabetic group, a punctuation/cursor control group, an editing/control function group, a numerical/mathematical group, and a punctuation/symbolic-type group. The chordic keyboard system also includes means for receiving data from the chordic keyboard identifying a selected chord of the plurality of chords, means for identifying, using the stored data and symbols, the group corresponding to the selected chord, and for identifying a selected symbol of the plurality of symbols representative of the selected chord, and means for generating a signal corresponding to the selected symbol.

83 Claims, 15 Drawing Sheets

U.S. PATENT DOCUMENTS

| | | | |
|---|---|---|---|
| 2,532,228 | 11/1950 | Hesh . | |
| 2,717,686 | 9/1955 | Seeber et al. . | |
| 3,022,878 | 2/1962 | Seibel et al. . | |
| 3,225,883 | 12/1965 | Ayres . | |
| 3,633,724 | 1/1972 | Samuel | 400/485 |
| 3,833,765 | 9/1974 | Hilborn et al. | 178/79 |
| 3,967,273 | 6/1976 | Knowlton | 341/22 |
| 4,029,915 | 6/1977 | Ojima | 364/709.15 |
| 4,042,777 | 8/1977 | Bequaert et al. | 178/79 |
| 4,067,431 | 1/1978 | Whitaker | 400/485 |
| 4,081,068 | 3/1978 | Zapp | 341/32 |
| 4,201,489 | 6/1980 | Zapp | 400/485 |
| 4,344,069 | 8/1982 | Prame | 341/26 |
| 4,360,892 | 11/1982 | Endfield | 364/419.15 |
| 4,442,506 | 4/1984 | Endfield | 341/22 |
| 4,443,789 | 4/1984 | Enfield et al. | 341/22 |
| 4,502,038 | 2/1985 | Lowenthal et al. | 341/26 |
| 4,516,939 | 5/1985 | Crimmins, Jr. | 434/114 |
| 4,549,279 | 10/1985 | Lapeyre | 200/6 A |
| 4,584,443 | 4/1986 | Yaeger | 200/6 A |
| 4,638,306 | 1/1987 | Rollhaus et al. | 341/28 |
| 4,680,572 | 7/1987 | Meguire et al. | 341/24 |
| 4,694,280 | 9/1987 | Rollhaus et al. | 341/26 |
| 4,715,736 | 12/1987 | McGunnigle | 400/484 |
| 4,737,040 | 4/1988 | Moon | 400/110 |
| 4,775,255 | 10/1988 | Langley | 400/485 |
| 4,804,279 | 2/1989 | Berkelmans et al. | 400/49 |
| 4,824,268 | 5/1989 | Diernisse | 400/486 |
| 4,833,446 | 5/1989 | Eilam et al. | 341/22 |
| 4,846,598 | 7/1989 | Livits | 400/472 |
| 4,891,777 | 1/1990 | Lapeyre | 364/706 |
| 4,897,649 | 1/1990 | Stucki | 341/22 |
| 4,911,565 | 3/1990 | Ryan | 400/100 |
| 4,913,573 | 4/1990 | Retter | 400/489 |
| 4,917,516 | 4/1990 | Retter | 400/489 |
| 5,017,030 | 5/1991 | Crews | 400/485 |
| 5,062,070 | 10/1991 | Lapeyre | 364/709.16 |
| 5,267,181 | 11/1993 | George | 364/709.12 |

OTHER PUBLICATIONS

D. Gopher, "The Contribution of Vision–Based Imagery to the Acquisition and Operation of a Transcription Skill." Cognition and Motor Processes, 1984, pp. 195–208.

N. Rochester, F. C. Bequaert, & E. M. Sharp, "The Chord Keyboard," IEEE, Dec. 1978, pp. 57–63.

H. C. Ratz & D. K. Ritchie, "Operator Performance on a Chord Keyboard," Journal of Applied Psychology, vol. 45, No. 5, 1961, pp. 303–308.

L. R. Creamer & D. A. Trumbo, "Multifinger Tapping Performance as a Function of the Direction of Tapping Movements," Journal of Applied Psychology, vol. 44, No. 6, 1960 pp. 376–380.

J. I. Elkind & C. D. Forgie, "Characteristics of the Human Operator in Simple Manual Control Systems," IRE Transactions on Automatic Control May, 1959, pp. 44–55.

K. H. Eberhard Kroemer, "Human Engineering the Keyboard," Human Factors, 1972, 14(1), pp. 51–63.

I. Litterik, "Qwertyuiop—dinosaur in a computer age," New Scientist, Jan. 8, 1981, pp. 66–68.

D. E. Rumelhart & D. A. Norman, "Simulating a Skilled Typist: A Study of Skiled Cognitive–Motor Performance." Cognitive Science, vol. 6, 1982, pp. 1–36.

D. Raiji, D. Gopher & R. Kimchi, "Perceptual and Motor Determinants of Efficient Data Entry," Proceedings of the Human Factors Society, 31st Annual Meeting, 1987, pp. 820–824.

D. Gopher, D. Karis & W. Koenig, "The Representation of Movement Schemes in Long Term Memory: Lessons from the Acquisition of a Transcription Skill" Acta Psychologica 60, 1985, pp. 105–134.

D. Gopher, "Experiments with a Two Hand Chord Keyboard—The Strcuture and Acquisition Process of a Complex Transcription Skill", Report for the U.S. Office of Naval Research, Aug., 1986, pp. 1–63.

D. Gopher & D. Raji, "Typing with a Two–Hand Chord Keyboard: Will the QWERTY Becomes Obsolete?," IEEE Transactions on Systems, Man, and Cybernetics, vol. 18, No. 4, Aug. 1988, pp. 601–609.

Vatell Corporation, "Tests of a Ternary Chord–Type Keyboard," Final Report, 1987, pp. 1–65.

H. M. Bowen & G. V. Guinness, "Preliminary Experiments on Keyboard Design for Semiautomatic Mail Sorting," Journal of Applied Psychology, vol. 49, No. 3, 1965, pp. 194–198.

R. Seibel, "Perforamnce on a Five–Finger Chord Keyboard," Journal of Applied Psychology, vol. 46, No. 3, 1962, pp. 165–169.

Copy of International Search Report mailed Oct. 28, 1992.

David Raij et al., "Perceptual And Motor Determinants Of Efficient Data Entry," Proceedings Of The Human Factors Society, 31st Annual Meeting, 1987, pp. 820–824.

FIG. 10A

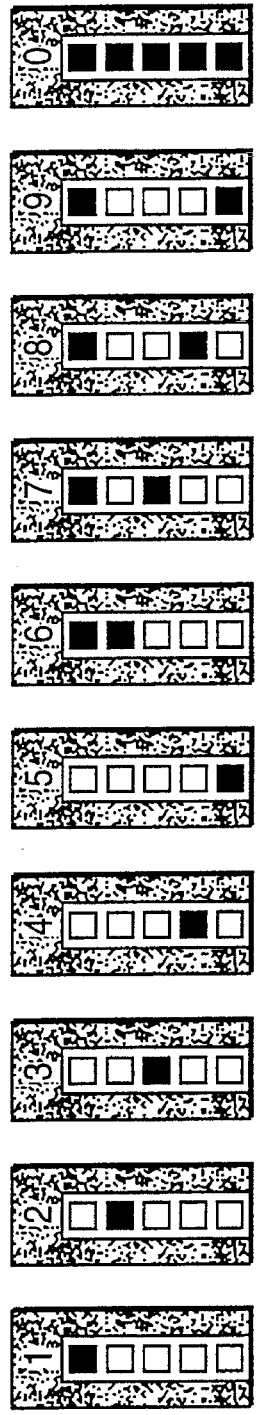

QUICK REFERENCE GUIDE

RED DIAMOND SHIFT FAMILY (All the chords in this family use a White thumb key)   Numbers And Mathematical Signs

| Character/Function | Chord | Character/Function | Chord | Character/Function | Chord |
|---|---|---|---|---|---|
| + Add | A | − Subtract | S | = Equal | E |
| * Multiply | M | / Divide | D | > Greater Than | H |
| % Percent | P | # Number | N | < Less Than | Z |

| Character/Function | Chord |
|---|---|
| $ (US Dollar) | U |
| Space (Blank) | B |

(Higher)

FIG. 10B

RED DIAMOND AND INDEX FINGER SHIFT FAMILY

| Character/Function | Chord | Character/Function | Chord |
|---|---|---|---|
| ! Exclamation | E | @ At | W |
| ? Question Mark | Q | - Hyphen | H |
| : Colon | C | _ Underline | U |
| ; Semicolon | S | \| Vertical Line | V |
| & Ampersand | A | / Forward Slash | F |
| " Double Quote | D | \ Back Slash | B |

(Think of a Wave)

Punctuation and Symbols
(Use a White thumb key)

| Character/Function | Chord | Character/Function | Chord |
|---|---|---|---|
| ^ Caret (Karet) | K | ( Open Parenthesis | O |
| ~ Tilde | T | ) Close (eXit) Parenthesis | X |
| # Pound | P | [ Initiate Bracket | I |
| * Aste Risk | R | ] Lock Bracket | L |
| ` Grave (quote) | G | { Open Brace | Y |
| Space | | } Close Brace | Z |

(White Thumb)

FIG. 11C

RED DIAMOND FAMILY (No SHIFT chord required - use a Red thumb key ◆)   Editing and Control Functions Enter the chord for the letter AND a Red thumb ◆

| Character/Function | Chord | Character/Function | Chord | Character/Function | Chord |
|---|---|---|---|---|---|
| Alt | Red+ T | End | Red+ E | Page Up | Red+ U |
| Control (Ctrl) | Red+ K(trl) | Escape (Esc) | Red+ S(eSc) | Page Down | Red+ D |
| Delete (Del) | Red+ W(ipe) | Insert (Ins) (Think of Block out) | Red+ B | Scroll Lock | Red+ R(soft) |
| Home | Red+ H | Print Screen | Red+ Z | | |

CHORDIC KEYBOARD SYSTEM FOR GENERATING A SIGNAL IN RESPONSE TO A CHORD THAT IS ASSIGNED USING A CORRELATION BASED ON A COMPOSITE CHORD-DIFFICULTY INDEX

This application is a continuation of application Ser. No. 07/722,326, filed Jun. 28, 1991, now abandoned.

BACKGROUND OF THE INVENTION

A portion of the disclosure of this patent document contains material which is subject to copyright protection. The copyright owner has no objection to the facsimile reproduction anyone of the patent document or the patent disclosure, as it appears in the U.S. Patent and Trademark Office patent file or records, but otherwise reserves all copyright rights whatsoever.

A. Field of the Invention

This invention relates generally to the art of man-machine interfaces; and, in particular, to keyboard interfaces which use one or both hands to signal chords of information to a computer.

B. Discussion of Related Art

Since the dawn of computers, people have been communicating with computers in many ways, but none so prolific as the standard QWERTY keyboard. The QWERTY keyboard was established more than 100 years ago in the golden age of mechanical engineering. Yet, while the mechanical design constraints of that golden era have long since passed away, the QWERTY keyboard has not - despite its many disadvantages. The layout of the QWERTY keyboard was designed to slow down an operator who might otherwise tax the response time of a mechanical assembly.

We are frequently amazed by the speed at which the fingers of an accomplished typist can fly over the QWERTY keyboard. Our amazement resides in the fact that we know that touch typing on a QWERTY keyboard is a highly complex skill requiring many many hours of practice to master, as well as continuous hours of practice to maintain. Yet, we also know that an alternative keyboard, which requires less time to master but which provides equal or superior performance, is certainly desired.

A chordic keyboard has been suggested as an alternative to the QWERTY keyboard. Compared to the QWERTY keyboard, a chordic keyboard is a keyboard with a limited number of keys. While the QWERTY keyboard requires a unique key for each letter, the chordic keyboard does not. Instead of assigning unique keys to each letter, a chordic keyboard may assign a chord of keys to each letter. Thus, the term "chordic keyboard" is derived from the fact that the operator may actuate several keys simultaneously to signal the letter of other symbol to the machine. The keys which are simultaneously activated are referred to as a "chord." In the domain of man-machine interfaces, each chord corresponds to a symbol from a symbol set. When the symbol set is the English language, each letter is defined as a symbol.

U.S. Pat. No. 4,360,892, 4,442,506 and 4,443,789, to Endfield et al. suggests a five key chordic keyboard wherein chord assignment is based on the pictorial relationship of the keys to letters and punctuation marks. In assigning chords based solely on pictorial relationships, the Endfield chordic keyboard ignores other relevant criteria, such as motor and perceptual determinants. These determinants were investigated and indexed by Ray, Kimchi and Gopher. (See "Perceptual and Motor Determinants of Efficient Data Entry," Proceedings of the Human Factors Society 31st Annual Meeting 1987 pages 820–829 hereinafter referred to as the "PM Determinant Paper").

U.S. Pat. No. 4516939 to Crimmins describes, among other matters, ten key device for receiving and translating chords made by an operator. However, Crimmins does not in any way address chord mapping schemes.

U.S. Pat. No. 4,833,446 to Eillam et al. describes a chordic keyboard wherein the chord assignment is based on groups of letters and wherein each group forms a recognizable combination of letters. These combinations are provided to assist the operator in associating the chord with the character. However, while such memory assisting associations may allow an operator to more easily learn chordic data entry skills, such memory assisted associations ultimately limit an operator's ability to achieve a performance level which is physiologically attainable.

Eilam et al.'s and Endfield et al.'s groupings are purely memory aids—aids which eventually inhibit ultimate performance.

SUMMARY OF THE INVENTION

A. Overview.

The present invention is a primary chord random access chordic keyboard system comprised of: a) dual, tilt-rotated, chordic keyboards interfacable to a computer-based machine (the "Smart Machine"); and, b) a chordic keyboard driver software program (the "Driver Program") loadable and executable on the Smart Machine. The tilt-rotated feature presents certain ergonomic conveniences.

The chordic keyboard is said to be "tilt-rotated" in that the chordic keyboard has certain ergonomic features which, when compared to the hand position used to operate a QWERTY keyboard, 1) upwardly tilt the hands with respect to the wrist and 2) rotate the hands inward toward the operator's body. This rotation also tends to displace the operator's elbows such that the operator's elbows are further away from the operator's torso.

This tilt and rotate feature provides a postural and perceptual feature in which both hands can be mapped symmetrically in space and in anatomy. It allows the operator to perceive the relative positions of the thumb and finger in a vertical sense. Thus, the thumb is easily perceived as being higher than the forefinger, the forefinger higher than the middle finger, etc. This "verticality" or "spatial congruence" feature is most beneficial in training operators and in operating dual chordic keyboards.

In a preferred embodiment of the invention, the chordic keyboard is tilted and contains an integrated palm rest. Ergonomically, these features combine to provide an optimal posture for the hand and arms, relief from carpal tunnel tension and relief from the weight of the arms and hand. These features assure an operator's long term performance without fatigue. Also, in a preferred embodiment of the invention, the dual chordic keyboards can be separated into two single chordic keyboards which can be placed on either side of the QWERTY keyboard, or other existing input device, so as to allow the operator the flexibility and versatility to freely use the various input devices.

The Driver Program enables the Smart Machine to interpret chords from either or both chordic keyboards in accordance with a chord map wherein the primary symbols are mapped to the primary chords based on a correlation of two indices: 1) the index of relative frequency of use of the primary symbols; and, 2) the index of perceptual and motor constraints (shown in Table "A"). The use-frequency index for the alphabet as the primary symbols is shown in Table "B". The primary chord map assures that the most frequently used primary symbols are mapped into the chords which are the easiest and most efficient to use. Thus, the invention assures optimal and fast data entry and retrieval of primary symbols. The Driver Program also enables the Smart Machine to interpret chords based on a multi-family organizational scheme which assists the operator in learning and using the chordic keyboard system. The multi-family organizational scheme assures ease of chord memorization and learning.

The Driver Program also enables the Smart Machine to interpret chords from a dual chordic keyboard in a manner which supports parallel and simultaneous chord entry by both hands. This dual-hand operating feature provides for increased functional efficiency and flexibility of use. The Driver Program also allows the chordic keyboard to be used in conjunction with, rather than as a replacement for, any existing input device (such as a QWERTY keyboard).

B. Optimization of Data Entry and Retrieval.

There are several features of the invention which assure optimal and fast data entry and retrieval of the primary chords.

1. It is a feature of the invention to develop chord maps based on the motor and perceptual index which is shown in Table "A" (referred to hereinafter as the MP Index). The MP Index is correlated with the relative use frequency of each of the primary symbols used by the operator to communicate with the Smart Machine. For example, as the primary symbols in an English Language symbol set are the 26 letters of the alphabet and the space bar, these 27 symbols are mapped by correlating their frequency of use with the MP Index. (We note that, in the English language, the average length of a word is five characters. Thus, every sixth character, or approximately 17% of the characters, are spaces). This insures that the most frequently used letters are associated with the easiest chords in terms of motor and perceptual constraints.

2. It is a feature of the invention that the chords are mapped across the operator's two hands in a manner which supports both spatial congruence and hand symmetry. To illustrate the hand-symmetry feature, as illustrated in FIG. 9 of the Detailed Description of the Invention below, if the operator wants to communicate the letter C to the Smart Machine and the letter C is communicated with the right hand by using the thumb and middle finger, then the operator can likewise communicate the letter C with the left hand by using the thumb and middle finger. Likewise, to illustrate the spatial congruence feature, if the operator wants to communicate the letter C to the Smart Machine and the letter C is communicated with the right hand by using the top key (i.e., the thumb) and the third key (i.e., the middle finger), then the operator can likewise communicate the letter C with the left hand by using the highest member and the third highest member. Thus, the combined use of spatial congruence and hand symmetry eliminates perceptual confusion in two-handed systems. These two concepts unite to achieve a better machine. (Thinking horizontally creates confusion.) In short, the chord map for each hand is perceived as being identical anatomically and spacially.

3. It is a feature of the invention to use a "random access" method of chord map memorization rather than a mnemonic method (e.g. by grouping letters into words) to memorize the primary chords in the symbol set. For example, in terms of the English Language, mnemonics are not used to memorize the 26 letters of the alphabet. While others encourage the use of such memorization association techniques, such as Endfield and Eillam, et al, and while such memorization association techniques may allow for faster acquisition of the initial chordic keyboard skills, such memory association techniques eventually act as a restraint on achieving fast and efficient data entry and retrieval and attenuate the ultimate performance which can be physiologically achieved by an operator. Thus, in the present invention, the primary chords are memorized on a "random access" basis. This random access feature in the mapping of the primary chords allows an operator to achieve faster and more efficient data entry and retrieval and to approach the ultimate physiological performance threshold. In short, the random access feature allows the operator to efficiently communicate with the Smart Machine as quickly as possible.

4. It is a feature of the invention to use long travel, light touch keys as the only source of proprioceptive feedback.

It is thus an object of the invention to assure that the primary chords (which in the case of the English letters are the 26 letters of the alphabet and the space bar) are communicated to the Smart Machine in the fastest and most efficient manner.

C. Ease of Code Memorization and Learning.

There are several features which assure that an operator can easily memorize and learn the chordic keyboard system. The present system maps letters to the primary chords without using any explicit mnemonics or memory aids. Thus, to the user, letters appear to be randomly mapped to chords. This approach was adopted to eliminate a cognitive step in the processing and memorization of letters. While the present invention relies on several memory aids to establish family groups, such aids were intentionally excluded from the mapping of the primary chord family (e.g., letters of the alphabet) to facilitate random access to letter codes in memory.

1. It is a feature of the invention to organize the language used to communicate with the Smart Machine into multiple families and to use thumb control shift keys to associate between those families. In particular, in the case of the English language symbol set, five families have been established as follows:

a. Primary Symbols (alphabet and space bar)

b. Numbers and Mathematical Signs c. Punctuation and Cursor Control d. Editing Control Functions e. Special Characters Functions 2. It is a feature of the invention to color code and to differentially texture the thumb control keys to assist the operator in associating between the various families. The differential texture allows an operator the freedom to never have to look at his hands. This is particularly beneficial to those who are blind or whose sight is otherwise impaired in the operating environment.

3. It is a feature of the invention to use learning charts which present the chords in a vertical and color-coded mode.

4. It is a feature of the invention to use mnemonics (semantic and graphic) to assist in the memorization of non-primary chords. (For example: the chord for A is used for the addition symbol the chord for S is used for the subtract symbol.)

These features, as well as other features of chordic keyboards which we have discovered, have been combined so as to develop a superior chordic keyboard system.

It is thus an object of the invention to allow the operator to more easily memorize and learn the complete chord map.

D. Ergonomic Factors.

There are several features of the invention used to assure that an operator can perform long term, without fatigue. In particular, our invention reduces carpal tunnel tension and relieves certain other biomechanical constraints. When in use, the invention supports the weight of the operator's arms and hands.

1. It is a feature of the invention to have an integral palm rest as part of the chordic keyboard. This palm rest supports the hand and leads the operator to place his hand into the correct position.

2. It is a feature of the invention to have an approximately 20° upright tilt of the keyboard face. In this way, the hand of the operator is in a more relaxed and natural position. This operating position also avoids the harms associated with carpal tunnel tension and avoids other biomechanical constraints. In particular, the invention, when in use, relieves the weight of the operator's arms and hands.

Each side of the dual chordic keyboard is easily oriented to its optimum ergonomically proper positions due to the design of each keyboard housing. The top inside corners of each chordic keyboard are designed to be pressed against each other such that the bottom of the keyboards are displaced from each other. This assures that the operator's arms are properly oriented when operating the invention. The opposing hand forces assist in stablizing the invention housing.

It is thus an object of the invention to reduce carpal tunnel tension and to assure long-term operator performance without fatigue.

E. Functional Efficiencies and Flexibility of Use.

There are several features which assure increased functional efficiencies and flexibility of use.

1. It is a feature of the invention that each of the chordic keyboards in a dual chordic keyboard are functionally parallel and can be operated simultaneously. It is a feature of the invention that the Driver Program can program the Smart Machine to accept two-handed simultaneous and parallel operation of a dual chordic keyboard. In essence, completely two-handed independent use can be achieved without conflict or confusions as there can be a complete division of labor between each hand of the operator. (e.g., the operator could use one-hand to enter text from the Bible and use the other hand to enter text from the Koran).

It is thus an object of the invention to allow the operator to use each of his hands independently while also facilitating hand coordination in two-handed operation.

2. It is a feature of the invention to have the Driver Program allow an operator to assign macros to chords. It is thus an object of the invention to allow an operator to customize a chordic keyboard system for any given application.

3. It is a feature of the invention to have the Driver Program run in conjunction with, rather than as a replacement for, other I/O device driver programs running in the Smart Machine. It is a further feature of the invention that a dual chordic keyboard can be physically separated into two single chordic keyboards which can be placed at either side of an existing input device (such as a QWERTY keyboard). It is thus an object of the invention to allow the operator the freedom and flexibility to use multiple input devices. It is a further object of the invention to allow the operator to be gradually weaned away from less efficient and/or slower data entry and retrieval devices.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings, 1.

DETAILED DESCRIPTION OF THE INVENTION

Figure 1:
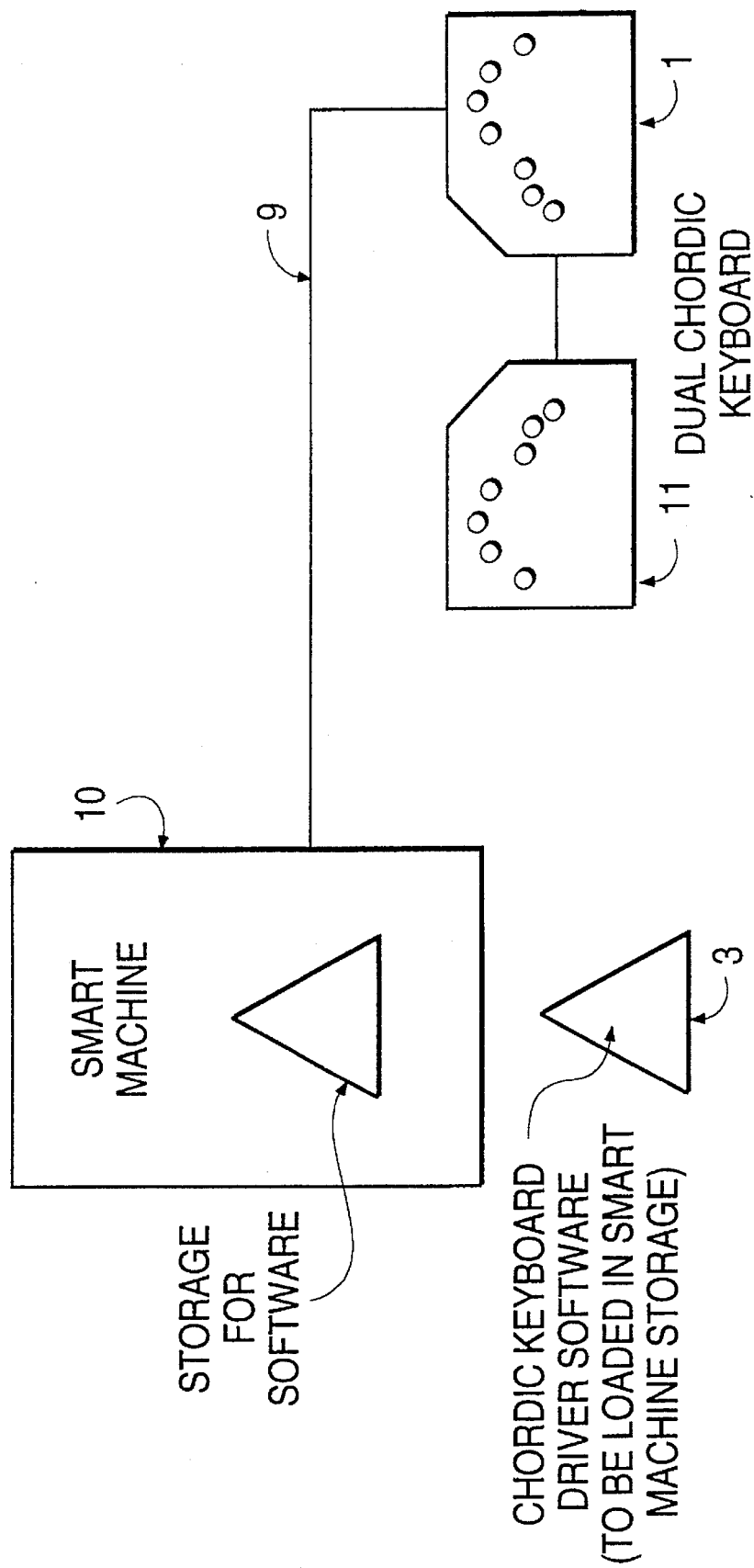
FIG. 1 shows a dual chordic keyboard connected to the Smart Machine which is loaded with the Driver Program.

An embodiment of the present invention as illustrated in FIG. 1 comprises a keyboard (1) with two groups keys (4) and (5) is coupled to a computer-based machine (the "Smart Machine") (10) through a transmission medium (9). The keys (4) and (5) are arranged in a hand pattern which facilitates one-handed operation. The Smart Machine (10) is programmed with a chordic keyboard Driver Program (hereinafter, the "Driver Program") (3). An operator actuating the keys (4) and (5) with one hand will produce chords of information which are transmitted to the Smart Machine (10) through the transmission medium (9). The Smart Machine (10), which is executing the Driver Program (3), receives the chords, and maps the chords into a symbol set. For each chord mapped by the Driver Program (3), the Driver Program (3) provides a symbol which can be used by the Smart Machine (10) for further processing. The symbol can be letters, words, or instructions. The meaning of the symbol is dependent on the application running in the Smart Machine.

Figure 2:
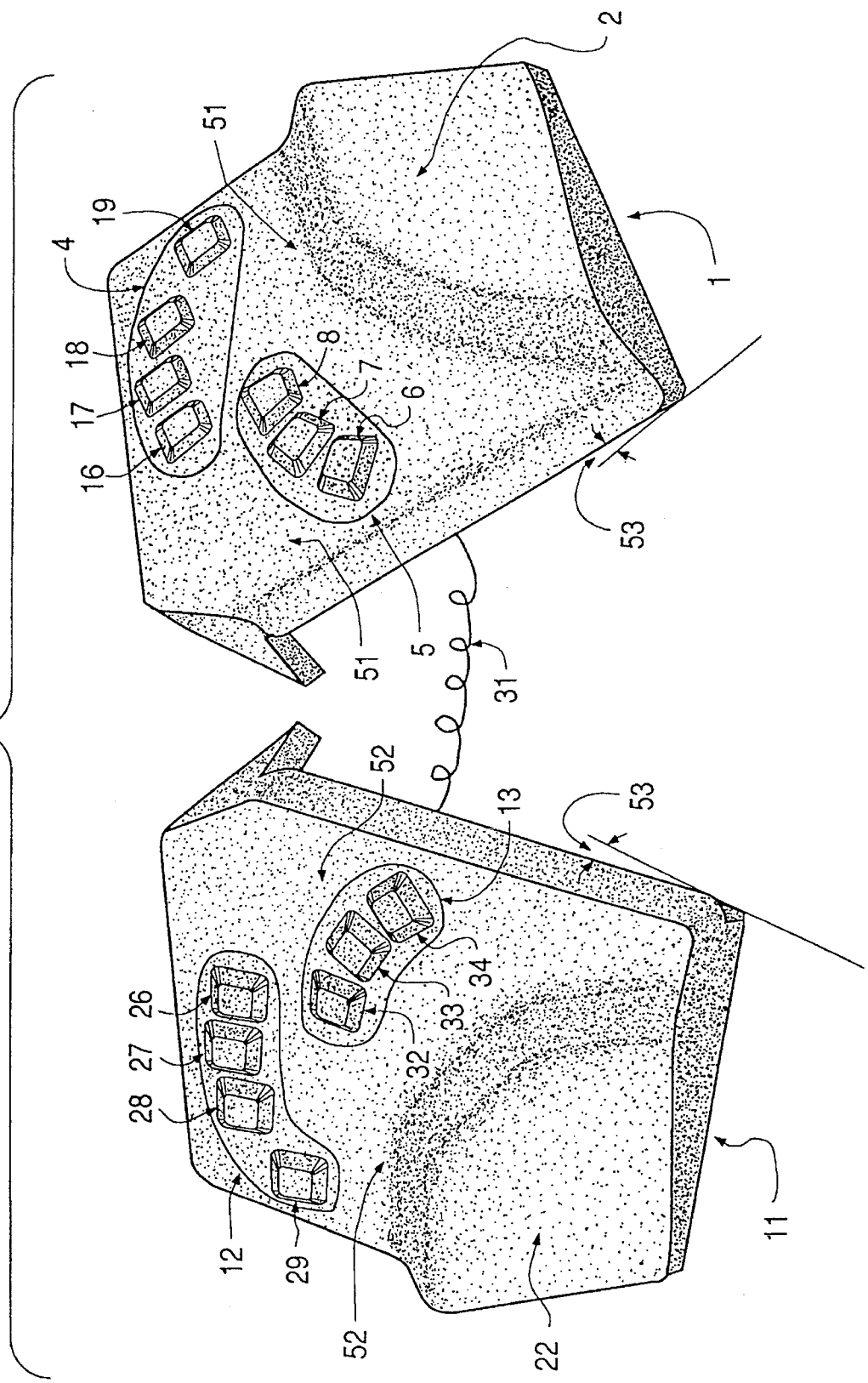
FIG. 2 is a view of the dual chordic keyboard showing the relative positions of the keys and the palm rest and the tilt angle of the keyboard housing.

In a preferred embodiment of the invention illustrated in FIG. 2, a keyboard (11) with two groups of keys (12) and (13) is coupled to keyboard (1) through transmission medium (31) to allow the operator to communicate with the Smart Machine (10) with both hands. Chords originating from the keyboard (11) are received and mapped by the Driver Program (3). The groups of keys (12) and (13) are arranged in a pattern which facilitates one-handed operation and are arranged in the hand-opposite pattern as that used for the groups of keys (4) and (5). Thus, if the groups of keys (4) and (5) are arranged in a right-hand pattern then the groups of keys (12) and (13) are arranged in a left-hand pattern. Likewise, if the groups of keys (12) and (13) are arranged in a right-hand pattern then the groups of keys (4) and (5) are arranged in a left-hand pattern.

So as to implement the spacial congruence feature, and for ergonomic goals, the keyboard (1) and the keyboard (11) are tilted such that the face (51) of the keyboard (1) and the face (52) of the keyboard (11) are at an angle (53) with respect to the plane horizontal to the operator. In a preferred embodiment of the invention, the angle (53) is in the range of 20° to 45°. If the angle is less than 19° or 20°, the invention's advantages in relieving carpal tunnel tension are essentially lost. If the angle is over 45°, then the height of the housing tends to exceed that of a QWERTY keyboard and thus loses the advantage of placing the keyboards on each side of the QWERTY keyboard. Also, if the angle exeeds 30°, then additional improvements are required to counteract the hand-pushing force on the housings.

In a preferred embodiment of the invention, keyboard (1) has an integral palm rest (2) and keyboard (11) has an integral palm rest (22). The palm rests (2) and (22) are raised and contoured in a palm receptive profile such that the palm rests (2) and (22) allow the operator to rest his hands on the palm rests (2) and (22) and thus support his hands and arms. The palm rests (2) and (22) and the tilt (as provided by angle (53)) of the keyboards (1) and (11) serve to reduce carpal tunnel tension and other biomechanical constraints.

The keyboard (1) has a finger group of keys (4) and a thumb group of keys (5). The finger group of keys (4) is comprised of four keys (16), (17), (18) and (19) arranged in a finger pattern (i.e. key (16) for forefinger, key (17) for middle finger, key (18) for ring finger and key (19) for little finger). The thumb group of keys (5) are located on the keyboard such that when the fingers of an operator are actuating the finger keys (4), the thumb of the operator can actuate the thumb keys (5).

The keyboard (11) also has a finger group of keys (12) and a thumb group of keys (13). The finger group of keys (12) is comprised of four keys (26), (27), (28) and (29) arranged in a finger pattern. The thumb group of keys (13) are located on the keyboard such that when the fingers of an operator are actuating the finger keys (12), the thumb of the operator can actuate the thumb keys (13).

Figure 8:
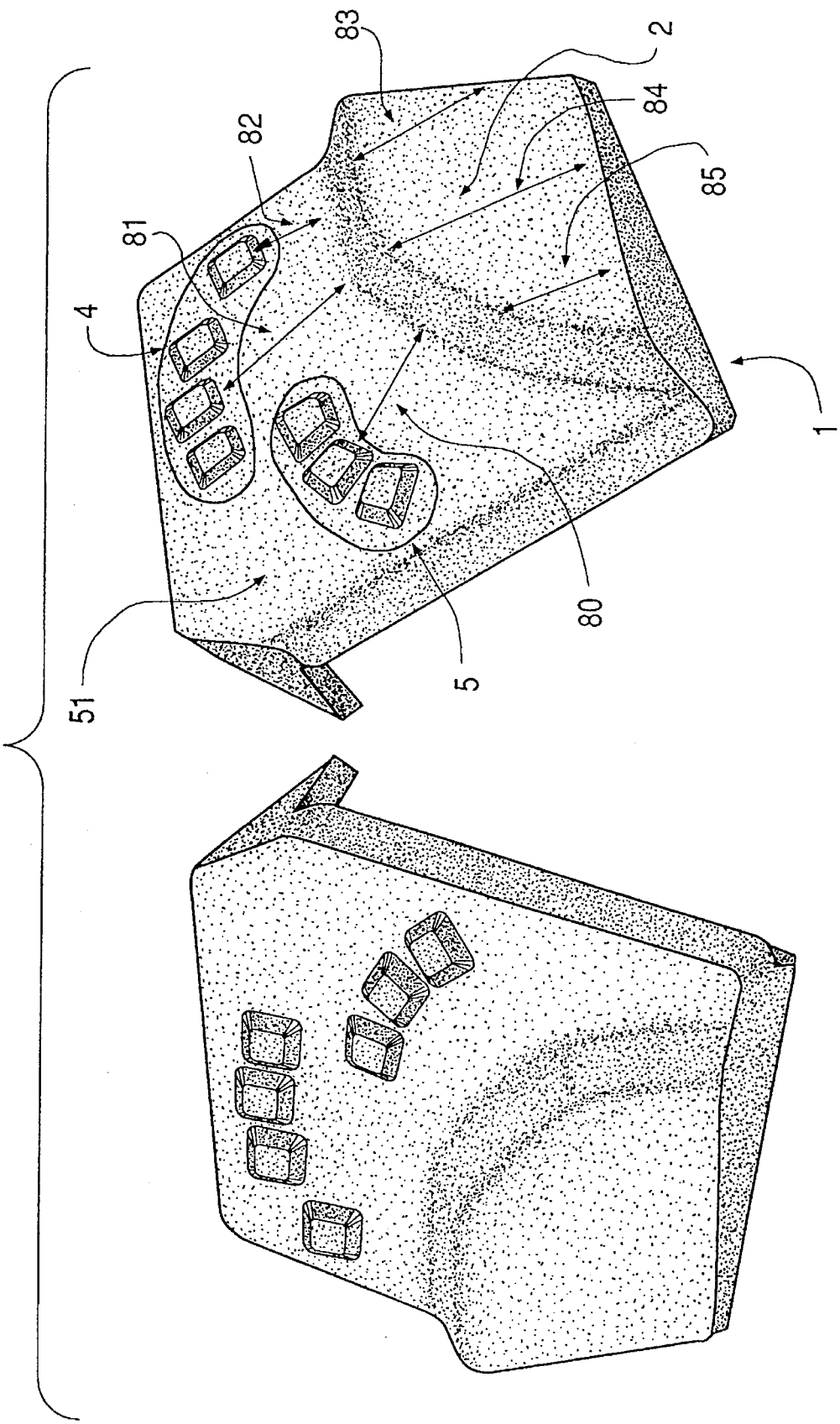
FIG. 8 shows the relative positions of the keys and palm rest as well as the size of the palm rest.

In a preferred embodiment of the invention, the group of keys (5) consist of three keys, (6), (7) and (8), and the thumb group of keys (13) consist of three keys (32), (33) and (34) wherein keys (6), (7), and (8) are arranged in an arc approximating the arc formed by the travel of the tip of the operator's other thumb when the other fingers of the operator are positioned on the finger keys (4) and wherein keys (32), (33) and (34) are arranged in an arc approximating the arc formed by the travel of the tip of the operator's thumb when the fingers of the operator are positioned on the finger keys (12). The palm rests (2) and (22)) are fixed, elevated and spacy, thus enabling comfortable placement of the operator's palms while entering chords at high speeds. The distance from the groups of keys (4) and (5) to palm rest (2) and, likewise, the distance from the groups of keys (12) and (13) to palm rest (22), as well as the size and area of palm rests (2) and (22) have been especially designed to cover and fit the variability of palm and hand sizes in the adult population. Additionally, the palm rests (2) and (22) have sufficient margins to accommodate children of ten or eleven years and older. The palm rests (2) and (22) are also designed so that operators with small hands may rest their palms close enough to the row of typing keys while those with large hands can rest their palms far enough away from the typing keys, as illustrated in FIG. 8 by the distance 81 and 84 so as to achieve a comfortable typing posture. This is the reason for the wide area palm rest. It accomodates the population and assure maximum comfort even though it is a fixed surface.

In a preferred embodiment of the invention, the distance from the center of the middle finger keys (17) and (27) to the palm rests (2) and (22), respectively, is approximately 9 cms; the distance of the thumb keys (5) and (13) and little fingers (19) and (29) to the palm rests (2) and (22), respectively, are, approximately 6 cms; the depth of the palm rests (2) and (22) end to end at the center is approximately 9 cms; as illustrated in FIG. 8 by the distances 80, 82, and 83 and, the depth of palm rests (2) and (22) is approximately 6 cms at the group of thumb keys (5) and (13), respectively.

The anthropometric measures are taken from the following reference: Anthropometric Source Book Volume II Handbook of Anthropometric Data. NASA Scientific and Technical Information Services, 1978.

The relevant information are in the following pages:

| percentiles | 1% | 99% in Cms |
|---|---|---|
| Hand length pp 239 | 16 | 21.5 |
| Palm length pp 311 | 9 | 12 |
| Thumb-crotch length pp 379 | 3.8 | 6.2 |

Assuming that people enter chords with convexed hands, the respective palm rest should span from 12.2–15.3 cms from the center of the middle finger keys. The palm rests (2) and (22) range from 9 to 18 cms, thus accomodating smaller and larger hands.

In a preferred embodiment of the invention, the keys (6) and (34), of the groups of thumb keys (5) and (13), respectively, are color coded blue, the keys (7) and (33) are color coded white and the keys (8) and (32) are color coded red. The features associated with this color coding are described later.

In the preferred embodiment of the invention, the groups of keys (4), (5), (12) and (13) are long travel, light touch, and serve as the only source of pro-preioceptive feedback to the operator.

Figure 3:
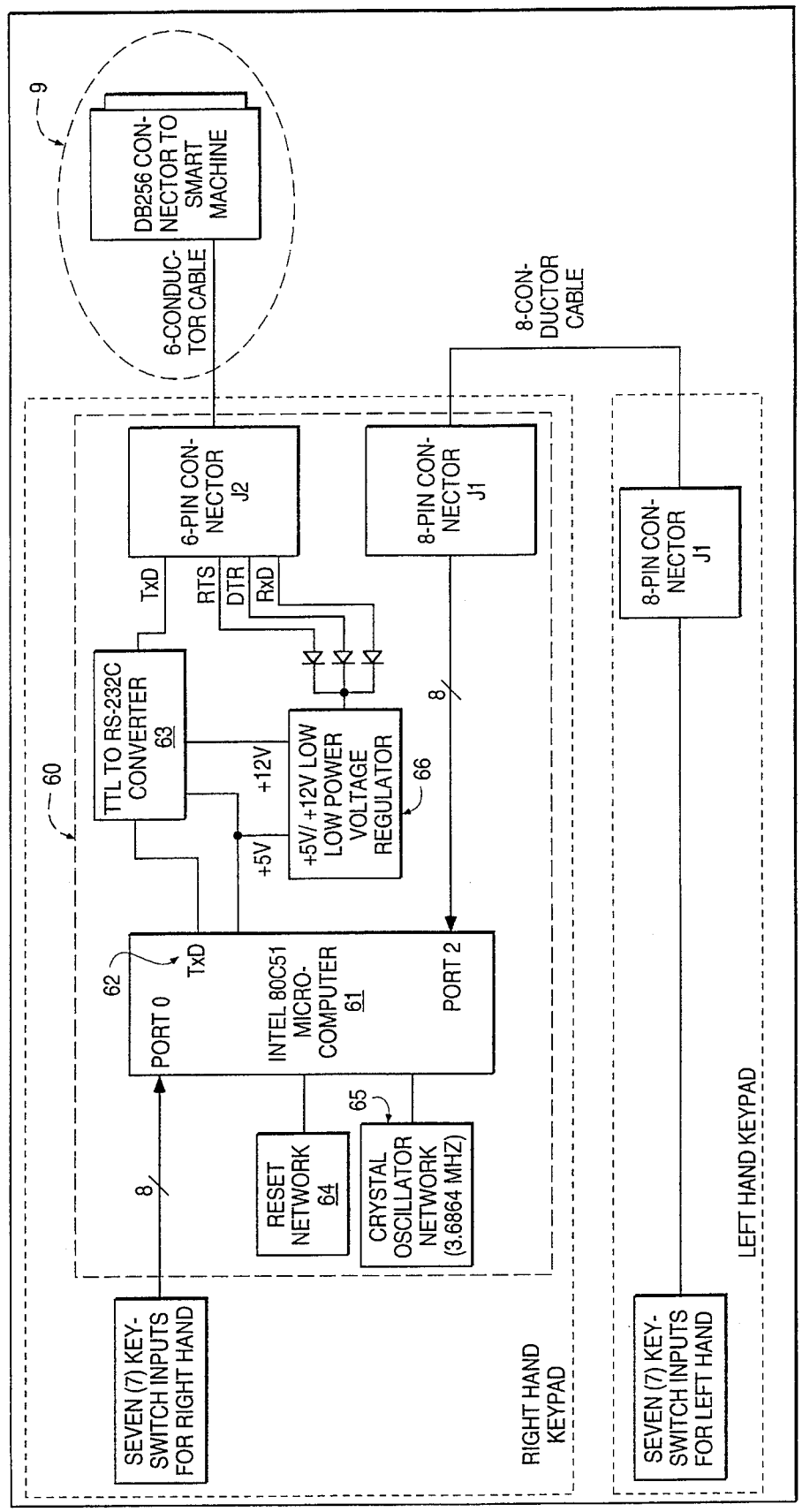
FIG. 3 shows the schematic diagram of the detector, debouncer and communication circuit.
Figure 4:
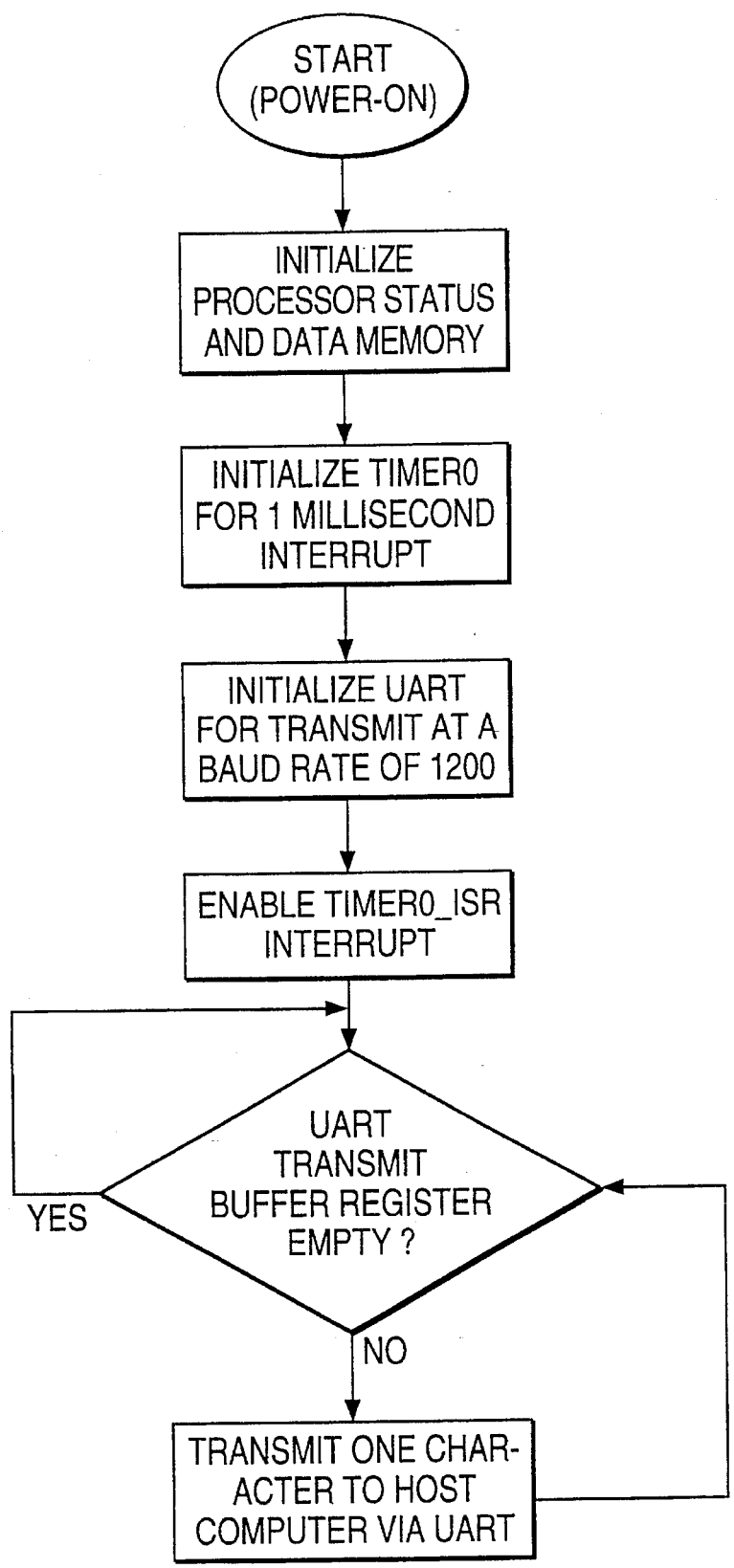
FIGS. 4 & 5 show the flow chart of the detector, debouncer and communication code.
Figure 5:
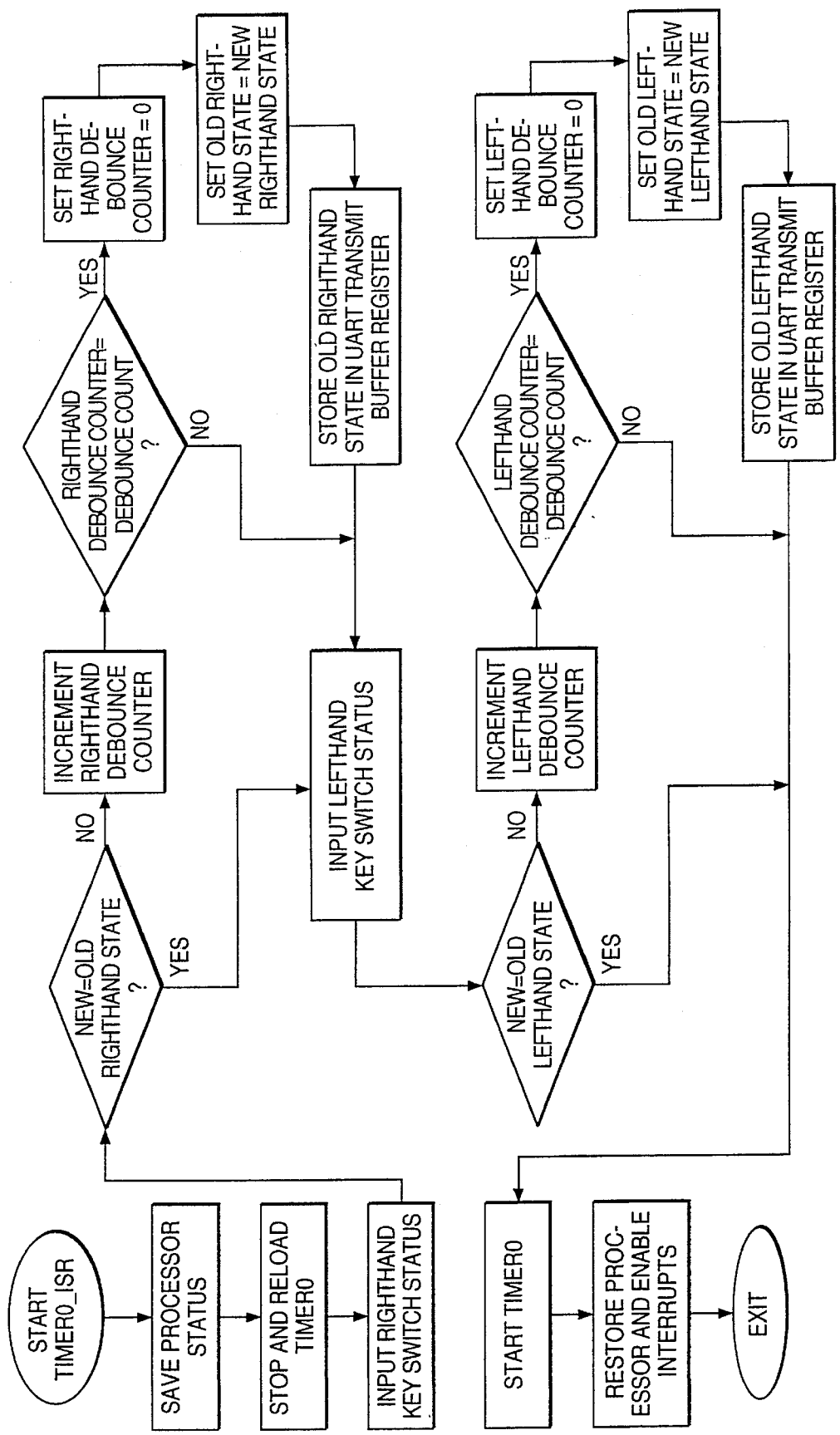

As illustrated in FIG. 3, in the preferred embodiment of the present invention, the groups of keys (4), (5), (12) and (13) are electrically coupled to a detector, debouncer and communication system (60). This detector, debouncer and communication system (60) serves to detect any changes in the state of any of the keys of groups (4), (5), (12) and (13) and to debounce those keys so as to determine when a chord has been completed and to communicate the chord to the Smart Machine (10) through the transmission medium (9). In the preferred embodiment of the invention, the detector, debouncer and communication system (60) is comprised of a micro-computer (61) which is electrically coupled to the keys of groups (4), (5), (12) and (13). The micro-computer is programmed to periodically interrogate the keys of groups (4), (5), (12) and (13) to detect any change in the keys of groups (4), (5), (12) and (13) to debounce those changes. A flow chart of the software used to implement such interrogation, detection and debounce is shown in FIGS. 4 and 5. FIG. 4 illustrates a Main Routine. The Main Routine illustrates the general operations in the dual chordic keyboard (1 and 11), including the steps of initializing the keyboard (1 and 11) and transmitting data corresponding to input chords to the smart machine (10) or host computer.

FIG. 5 illustrates a Timer O_ISR Interrupt Service Routine. This routine includes the general operations of the timer interrupt routine of the keyboard (1 and 11) used to continually check for input data corresponding to chords. Using an Intel 80-C51 micro-computer as the micro-computer (61), the software can be used to perform these tasks.

The micro-computer transmit/receive port (62) is connected to a TTL to RS-232C converter (63), the output of which is connected and electrically coupled to the transmission medium (9). Other means of coupling the micro-computer (61) to the transmission medium (9) could be employed, such as infra-red or optical coupling. Additionally, a parallel protocol and interface, instead of a serial protocol and interface, could be used to transmit the chord from the micro-computer (61) to the Smart Machine (10) through the transmission medium (9).

In the preferred embodiment of the invention, a reset network (64), crystal oscillator network (65), and power supply (66) are used to support the micro-computer (61) in a means that would be known to one skilled in the art.

In a preferred embodiment of the invention, eight bit bytes of data are formatted by micro-computer (61) to be transmitted to the Smart Machine (10). Seven of the eight bits of data are used to indicate the state of each of the seven keys (4) and (5) on keyboard (1) or the seven keys (12) and (13) on keyboard (11). The eighth bit is used to indicate whether the chord is originating from keyboard (1) or keyboard (11).

In the preferred embodiment of the invention, the port (2) of micro-computer (61) is utilized for keyboard (11) and port 0 of micro-computer (61) is used for keyboard (1).

Figure 6A:
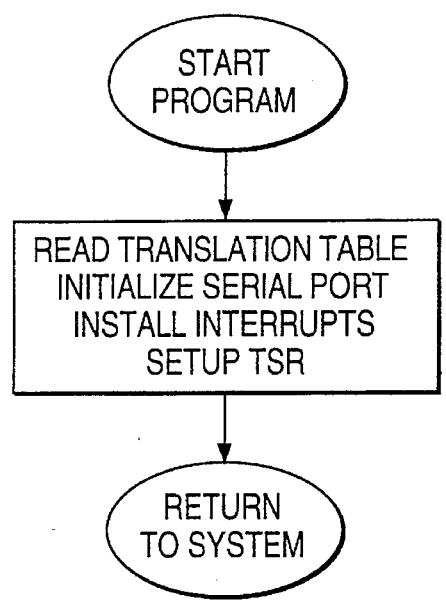
FIGS. 6 & 7 show the flow chart for the chordic keyboard Driver Program.
Figure 6B:
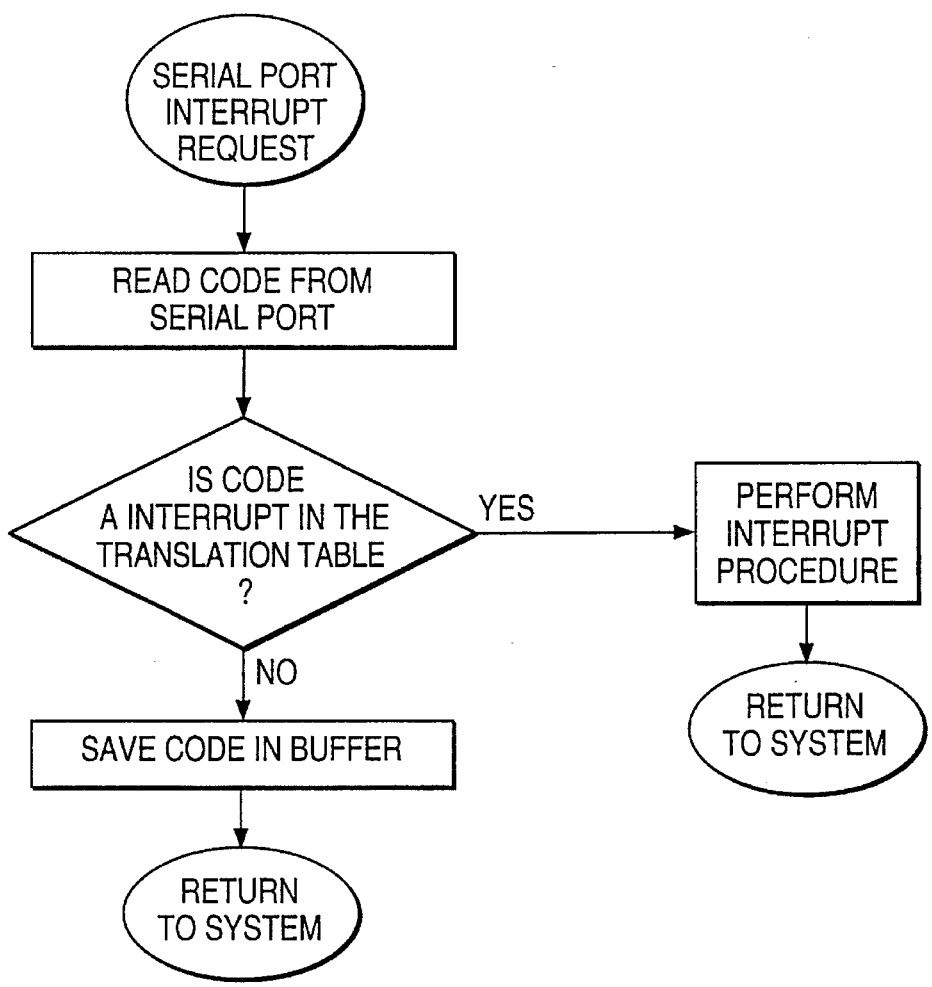
Figure 7:
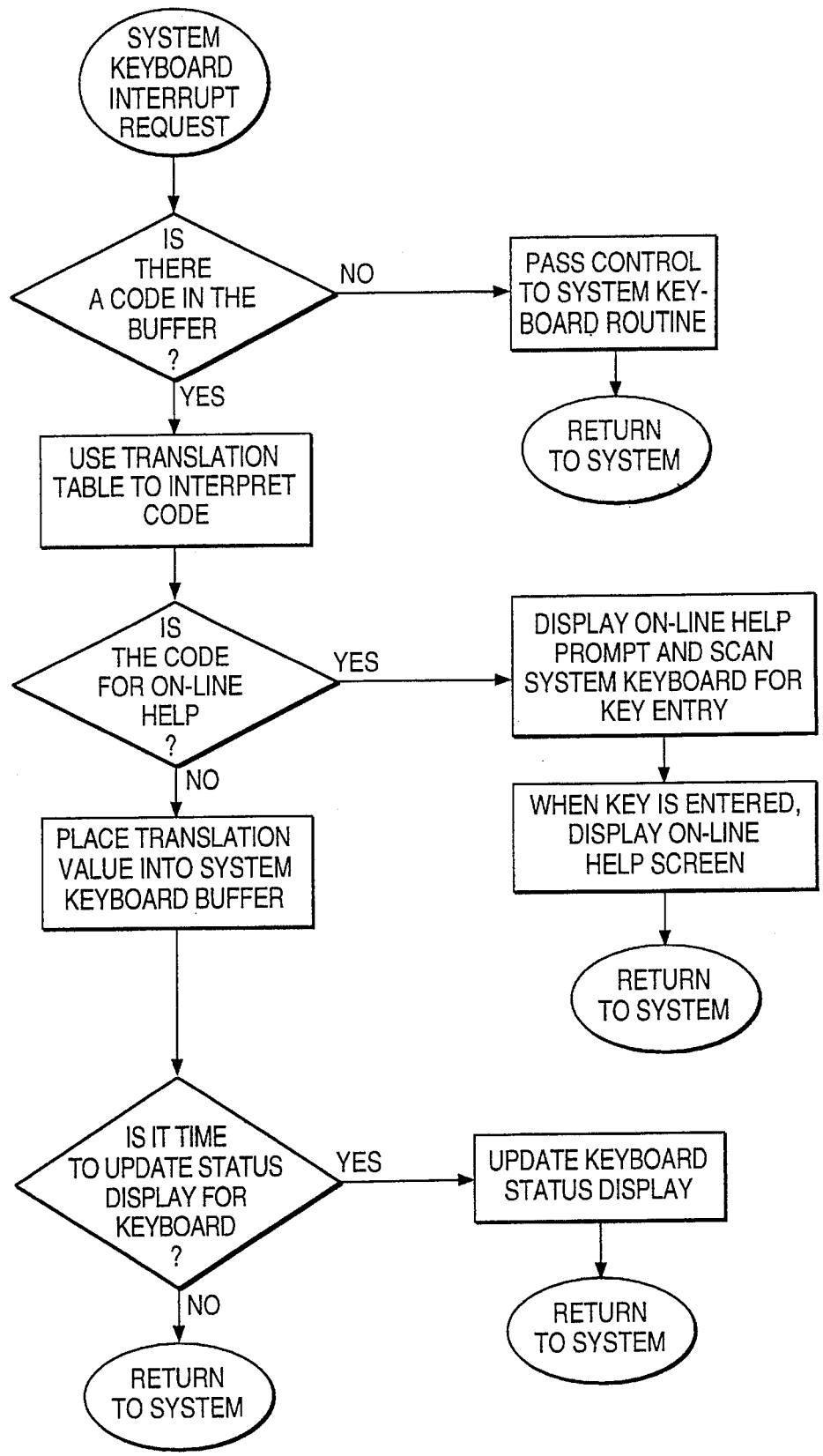

In the Smart Machine (10), a Driver Program (3) based on the flow chart shown in FIGS. 6 & 7 is loaded and executed in such machines as the PC class machines which are prevalent today, and which run under the MS-DOS operating system.

FIGS. 6 and 7 illustrate the steps of a Driver Program. The Driver Program is a part of the chordic keyboard driver program (3) in the smart machine (10) of FIG. 1 and includes the general operations of the smart machine (10) used to initialize the chordic keyboard system and to receive data from the chordic keyboard (1 and 11) corresponding to input chords. FIG. 7 illustrates a portion of the Driver Program continued from FIG. 6 and, specifically, the steps of the Driver Program in FIG. 6 implemented in the smart machine (10) to interpret the data received from the chordic keyboard corresponding to input chords into conventional character data for display.

Figure 9:
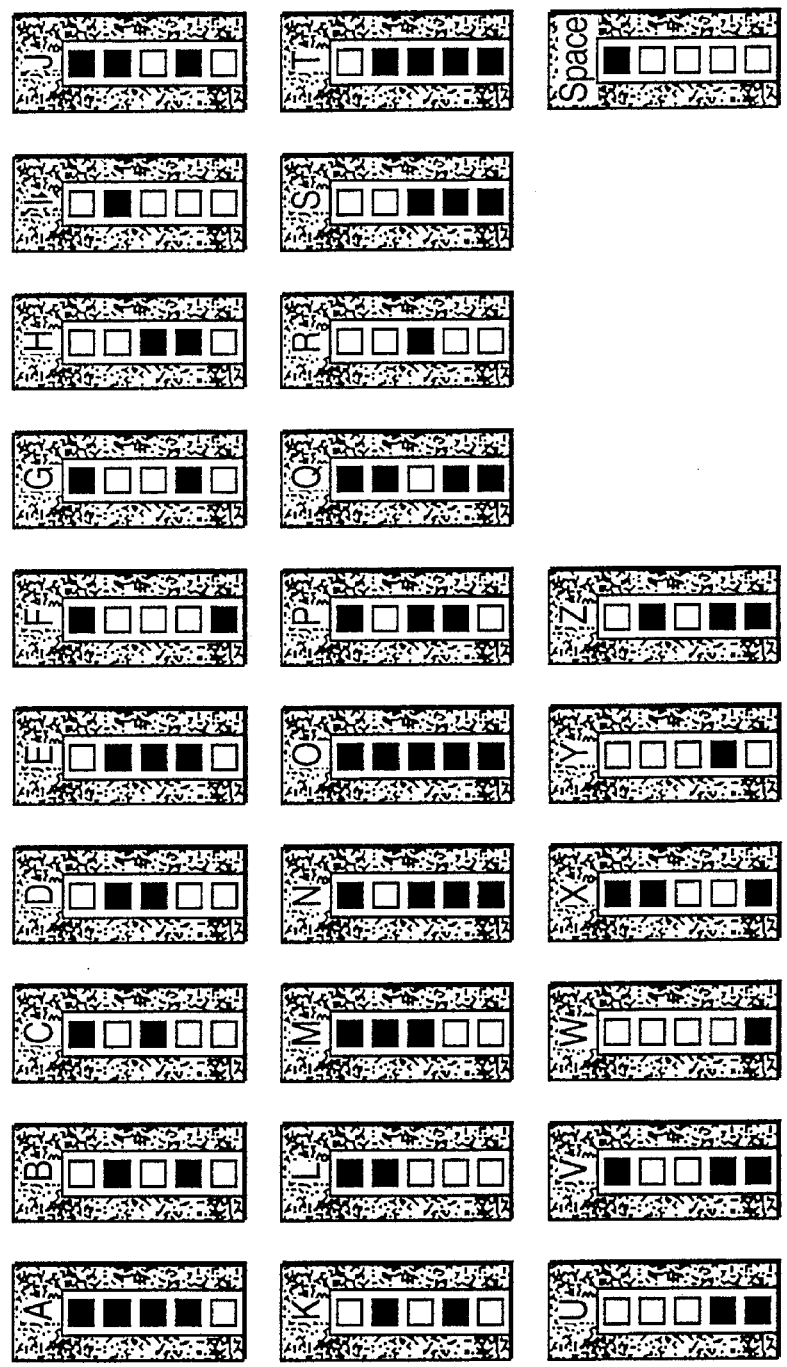
FIG. 9 shows the chord assignment for the English alphabet and space bar as the primary symbols.

The assignment of the English primary chords (i.e., the 26 letters and the space bar as represented by the software listed above) is shown in FIG. 9. In FIG. 9, the top box of each character code corresponds to the thumb key of each of keyboards (1) and (11). The four boxes below the top correspond respectively to the index finger key, the middle finger key, the ring finger key, and the little finger key. The assignment is based on the Gopher Correlation of the MP Index (Table "A"), the use-frequency index (Table "B" as grouped in accordance with Table "C"); hereinafter described.

The primary chord map for the English alphabet and space bar was derived in the following manner. As shown by reference to Table "D," each of the chords was assigned, in order of difficulty to one of seven groups based on the perceptual index and to one of eight groups based on the motor index. The perceptual index ranks the perceptual goodness and coherence of the spatial patterns that are created by the keys which are depressed together in each of the 31 basic chord combinations. This scale was constructed based on the ability of humans to commit to memory patterns displayed for short durations on a computer screen, and the speed at which these patterns could be retrieved from memory and compared with a subsequently displayed pattern. The motor difficulty index ranks the 31 basic chord combinations of the five fingers according to the biomechanical and motor difficulty of producing each chord. It was constructed using the judgments of humans employing the Paired-Comparison Standard scaling method and the Minimum Normit Chi-Square statistical technique, to determine scale values. In Table "D", group one represents the easiest to memorize or use and group 7 for the perceptual index and group 8 for the motor index represents the hardest to memorize or use, respectively.

The scores for each chord were then added together to form a chord-difficulty index for each chord. The composite chord-difficulty index was then used to assign the primary symbols (i.e., the English alphabet and space bar) to chords so as to match the eight groups of primary symbols (based on frequency of use) with eight groups of averaged composite chord-difficulty indices. The results are shown in Table E wherein the most frequently used group of symbols is assigned the lowest average composite chord-difficulty index and each successively and fequently used group of primary symbols is assigned to the next highest average composite chord-difficulty index. This procedure, or correlation, we refer to as the Gopher Correlation.

Figure 10C:
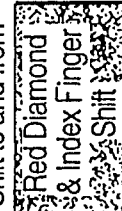
FIGS. 10 and 11, the Quick Reference Guide, show the five families of chords.
Figure 11A:
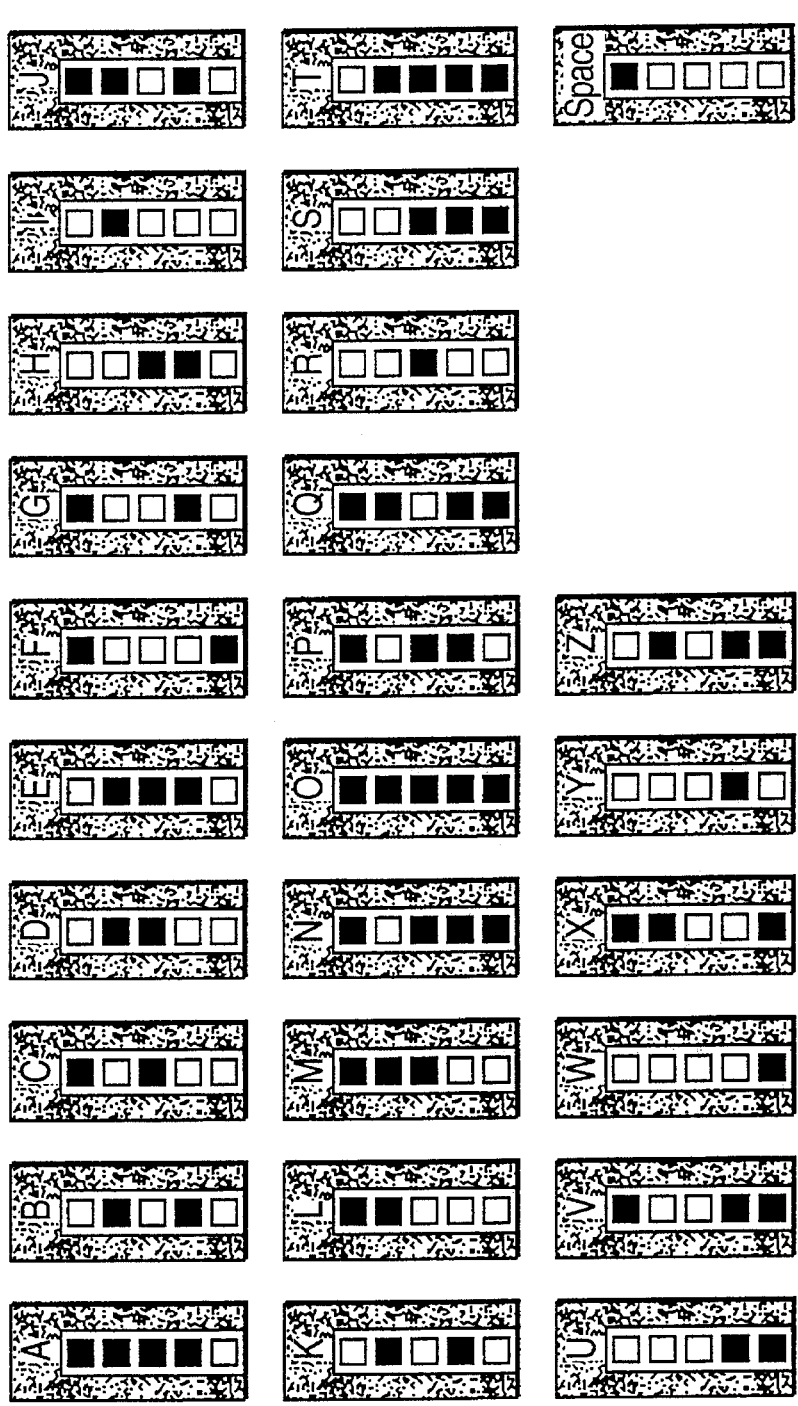
Figure 11B:
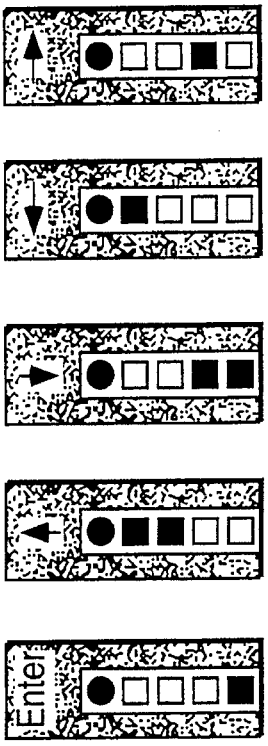

So as to assure overall ease of code memorization and learning (i.e. for chords in addition to those assigned to the primary symbols), the chords have been organized into five families as previously noted. These families are shown in FIGS. 10 and 11.

The punctuation and cursor control family, as well as the editing and control functions family, can be accessed by using the thumb to actuate either the blue key (6) (on the other hand, (15) or the red key (8) (or on the other hand, (14)). In the preferred embodiment of the invention, the punctuation and cursor control family has been assigned to the blue family. Punctuation or comma is chorded by entering the "C" end chord, but by actuating the blue thumb key (6) rather than the white thumb key (7). Similarly, the punctuation mark "period" is used by chording a "P" and substituting the blue key for the white key and an apostrophe is made by substituting the blue key for the white key. The association of "C" with comma, "P" with period and "A" with apostrophe is intended to assist the user in learning and remembering the chord assignment. Similarly, tab is assigned to the "T" chord, shift-tab to the "S" chord and backspace to the "B" chord, except that in each of these instances, the blue key must also be actuated to complete the chord. The cursor control characters are as follows:

Enter: Blue (shift) Thumb key and Index Finger Key

Up Arrow: Blue (shift) Thumb Key, Index Finger Key, Forefinger Key and Middle Finger Key Down Arrow: Blue (shift) Thumb Key, Ring Finger Key and Index Finger Key Left Arrow: Blue (shift) Thumb Key, and Index Finger Key Right Arrow: Blue Thumb Key and Ring Finger Key The editing and control functions are associated with the red diamond family and thus the red thumb key (8) (on the other hand, (32)). These editing control functions are shown in the table below, which again were selected so as to assist the user in memorizing the chord associated with the function.

The numbers and mathematical signs family, as well as the remaining punctuation and symbols family are also shown. A shift key operation is performed by a single depression of one of the shift keys, e.g., the red (diamond) thumb key. For example, to enter a chord for the numeral 1, an operator would depress the red (diamond) thumb key a single time to "shift" to the Red Diamond Shift Family and then depress the white thumb key. To lock the keyboards (1) and (11) in a particular shift family, the shift key, e.g., red (diamond) thumb key, is depressed twice. Thereafter, until the shift key is depressed again, only characters, numerals, or other functions may be entered.

Finally, to further assist in co-memorization and learning, learning charts are used which inherently show the verticality feature of the invention. Chords need only be presented once, not twice as would be required in certain other inventions for the right hand and the left hand.

The foregoing description of preferred embodiment(s) of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

TABLE A

PERCEPTUAL

| CHORD PATTERN | | | | | SAME | | DIF-FERENT | | MOTOR | |
|---|---|---|---|---|---|---|---|---|---|---|
| | | | | | Rank | RT | Rank | RT | Rank | Score Value |
| X | X | X | X | X | 1 | 196 | 4 | 297 | 1 | 0.00 |
| O | X | X | X | O | 2 | 229 | 29 | 338 | 2 | 0.30 |
| X | O | X | O | X | 3 | 240 | 15 | 316 | 28 | 2.96 |
| O | O | X | X | X | 4 | 241 | 6 | 302 | 10 | 0.93 |
| O | O | O | X | O | 5 | 246 | 2 | 283 | 19 | 1.61 |
| X | O | O | O | X | 6 | 247 | 14 | 315 | 15 | 1.16 |
| X | X | X | X | O | 7 | 249 | 10 | 312 | 4 | 0.65 |
| O | O | O | X | X | 8 | 249 | 17 | 318 | 18 | 1.58 |
| O | X | X | X | X | 9 | 249 | 8 | 311 | 3 | 0.33 |
| O | X | O | O | O | 10 | 250 | 5 | 298 | 8 | 0.79 |
| O | O | X | O | X | 11 | 251 | 1 | 274 | 7 | 0.79 |
| X | X | O | X | X | 12 | 252 | 28 | 337 | 26 | 2.24 |
| X | X | O | O | O | 13 | 253 | 23 | 330 | 13 | 0.97 |
| O | O | O | O | X | 14 | 264 | 30 | 340 | 20 | 1.63 |
| X | O | O | O | O | 15 | 265 | 3 | 288 | 6 | 0.77 |
| O | O | X | X | O | 16 | 264 | 9 | 311 | 11 | 0.94 |
| X | X | X | O | O | 17 | 266 | 12 | 315 | 12 | 1.48 |
| O | X | X | O | O | 18 | 266 | 18 | 320 | 9 | 0.85 |
| O | X | O | X | O | 19 | 266 | 11 | 314 | 23 | 2.09 |
| X | O | O | X | O | 20 | 271 | 20 | 324 | 17 | 1.48 |
| X | O | X | X | O | 21 | 277 | 19 | 323 | 16 | 1.24 |
| X | X | X | O | X | 22 | 278 | 26 | 336 | 29 | 3.16 |
| O | X | O | O | X | 23 | 278 | 7 | 306 | 22 | 2.03 |
| X | O | X | X | X | 24 | 279 | 27 | 337 | 5 | 0.76 |
| X | O | X | X | X | 25 | 284 | 25 | 333 | 21 | 1.81 |
| X | X | O | X | X | 26 | 286 | 24 | 331 | 24 | 2.12 |
| O | O | X | O | X | 27 | 287 | 21 | 326 | 31 | 3.36 |
| O | X | O | X | X | 28 | 289 | 16 | 318 | 27 | 2.49 |
| X | O | X | O | O | 29 | 299 | 13 | 316 | 14 | 1.00 |
| X | X | O | X | O | 30 | 310 | 22 | 328 | 25 | 2.23 |
| O | X | X | O | X | 31 | 319 | 31 | 350 | 30 | 3.33 |

A summary table for the main Perceptual and Motor measures associated with each of the 31 chords.

TABLE B

FREQUENCY OF OCCURRENCE OF LETTERS IN ENGLISH

| | Letter | Frequency of occurence in 1000 words | Frequency of occurrence in 1000 letters |
|---|---|---|---|
| 1. | E | 591 | 131.05 |
| 2. | T | 473 | 104.63 |
| 3. | A | 368 | 81.51 |
| 4. | O | 360 | 79.95 |
| 5. | N | 320 | 70.98 |
| 6. | R | 308 | 68.32 |
| 7. | I | 286 | 63.45 |
| 8. | S | 275 | 61.01 |
| 9. | H | 237 | 52.59 |
| 10. | D | 171 | 37.88 |
| 11. | L | 153 | 33.89 |
| 12. | F | 132 | 29.24 |
| 13. | C | 124 | 27.58 |
| 14. | M | 114 | 25.36 |
| 15. | U | 111 | 24.59 |
| 16. | G | 90 | 19.94 |
| 17. | Y | 89 | 19.82 |
| 18. | P | 80 | 19.82 |
| 19. | W | 68 | 15.39 |
| 20. | B | 65 | 14.40 |
| 21. | V | 41 | 9.19 |
| 22. | K | 19 | 4.20 |
| 23. | X | 7 | 1.66 |
| 24. | J | 6 | 1.32 |
| 25. | Q | 5 | 1.21 |
| 26. | Z | 3 | .77 |

Table from Pratt Fetcher (1939). Secret and Urgent, the Story of Codes and Ciphers. N.Y. Bobs-Merrill.

TABLE C

| I. | E |
| II. | T |
| III. | A, O, N, R, I, S |
| IV. | H |
| V. | D, L, F, C, M, U |
| VI. | G, Y, P, W, B |
| VII. | V, K, X, J, Q, Z |
| VIII. | SPACE BAR |

TABLE D

Ranks of chords associated with letters in the Peceptual and Motor indexes of chord difficulty.

| LETTER | PERCEPTUAL | MOTOR | SUM |
|---|---|---|---|
| A | 3 | 3 | 6 |
| B | 6 | 7 | 13 |
| C | 7 | 4 | 11 |
| D | 5 | 4 | 9 |
| E | 2 | 2 | 4 |
| F | 3 | 5 | 8 |
| G | 5 | 6 | 11 |
| H | 5 | 4 | 9 |
| I | 4 | 3 | 7 |
| J | 7 | 8 | 15 |
| K | 5 | 7 | 12 |
| L | 4 | 4 | 8 |
| M | 5 | 4 | 9 |
| N | 6 | 3 | 9 |
| O | 1 | 1 | 2 |
| P | 6 | 5 | 11 |
| Q | 4 | 8 | 12 |
| R | 4 | 3 | 7 |
| S | 3 | 4 | 7 |

TABLE D-continued

Ranks of chords associated with letters in the Peceptual and Motor indexes of chord difficulty.

| LETTER | PERCEPTUAL | MOTOR | SUM |
|--------|------------|-------|-----|
| T | 3 | 2 | 5 |
| U | 3 | 6 | 9 |
| V | 7 | 7 | 14 |
| W | 4 | 6 | 10 |
| X | 7 | 7 | 14 |
| Y | 5 | 6 | 11 |
| Z | 7 | 8 | 15 |
| SPACE | 4 | 3 | 7 |

TABLE E

SUM SOCRES ACCORDING TO LETTERS FREQUENCY IN ENGLISH TEXT

| GROUP | | LETTER | SCORE | GROUP AVERAGE |
|-------|---|--------|-------|---------------|
| 1 | 1 | E | 4 | 4 |
| 2 | 2 | T | 5 | 5 |
| 3 | 3 | A | 6 | 6.33 |
|   | 4 | O | 2 | |
|   | 5 | N | 9 | |
|   | 6 | R | 7 | |
|   | 7 | I | 7 | |
|   | 8 | S | 7 | |
| 4 | 9 | H | 9 | 9 |
| 5 | 10 | D | 9 | 9 |
|   | 11 | L | 8 | |
|   | 12 | F | 8 | |
|   | 13 | C | 11 | |
|   | 14 | M | 9 | |
|   | 15 | U | 9 | |
| 6 | 16 | G | 11 | 11.2 |
|   | 17 | Y | 11 | |
|   | 18 | P | 11 | |
|   | 19 | W | 10 | |
|   | 20 | B | 13 | |
| 7 | 21 | V | 14 | 13.67 |
|   | 22 | K | 12 | |
|   | 23 | X | 14 | |
|   | 24 | J | 15 | |
|   | 25 | Q | 12 | |
|   | 26 | Z | 15 | |
| 8 |   | SPACE | 7 | 7 |

We claim:

1. A chordic keyboard system for use by an operator having a hand including a thumb, fingers, and a palm, to communicate with a computer-based machine using a plurality of symbols, including a primary symbol set of said symbols, the chordic keyboard system comprising:

a tilted chordic keyboard with at least five keys and with an integral palm rest wherein said tilted chordic keyboard is comprised of a finger group of keys and a thumb group of keys and wherein said finger group of keys consists of four keys arranged in a finger pattern and wherein said thumb group of keys consists of at least one key and wherein said thumb group of keys are located on the keyboard in relation to said finger group of keys such that said thumb group of keys can be actuated by the thumb of the operator's hand while the fingers of said operator's hand are positioned on said finger group of keys and wherein said integral palm rest is integrated with said tilted chordic keyboard such that the palm of said operator's hand can rest on and be partially supported by said integral palm rest while the fingers of said operator's hand are positioned on said finger group of keys and the thumb of said operator's hand is positioned on said thumb group of keys and wherein said tilted chordic keyboard is tilted at an angle in a range of 20° to 45°;

means for detecting a plurality of chords of said finger group of keys and said thumb group of keys produced by the actuation of said finger group of keys and said thumb group of keys;

means for transmitting said chords to said computer-based machine; and means for programming said computer-based machine to receive said chords from said transmitting means and to assign to each primary symbol of said primary symbol set a unique chord, said assignment to be derived using a correlation based on a frequency-of-use index of the symbol and a composite chord-difficulty index of the unique chord such that when said computer-based machine is executing said programming means, said operator can communicate with said computer-based machine by actuating chords of keys on said tilted chordic keyboard.

2. A dual chordic keyboard system for use by an operator having a right hand and a left hand, each hand having a thumb, fingers, and a palm, to communicate with a computer-based machine using a plurality of symbols, including a primary symbol set of said symbols, the dual chordic keyboard system comprising:

a right-handed tilted chordic keyboard with at least five keys and with a right-handed integral palm rest wherein said right-handed tilted chordic keyboard is comprised of a right-handed finger group of keys and a right-handed thumb group of keys and wherein said right-handed finger group of keys consists of four keys arranged in a finger pattern and wherein said right-handed thumb group of keys consists of at least one key and wherein said right-handed thumb group of keys is located on the keyboard in relation to said right-handed finger group of keys such that said right-handed thumb group of keys can be actuated while the fingers of said operator's right hand are positioned on said right-handed finger group of keys and wherein said right-handed integral palm rest is integrated with said right-handed tilted chordic keyboard such that the operator's right palm can rest on and be partially supported by said right-handed integral palm rest while the fingers of said operator's right hand are positioned on said right-handed finger group of keys and the thumb of said operator's right hand is positioned on said right-handed thumb group of keys and wherein said right-handed tilted chordic keyboard is tilted at an angle in a range of 20° to 45°;

a left-handed tilted chordic keyboard with at least five keys and with an left-handed integral palm rest wherein said left-handed tilted chordic keyboard is comprised of a left-handed finger group of keys and a left-handed thumb group of keys and wherein said left-handed finger group of keys consists of four keys arranged in a finger pattern and wherein said left-handed thumb group of keys consists of at least one key and wherein said left-handed thumb group of keys is located on the keyboard in relation to said left-handed finger group of keys such that said left-handed thumb group of keys can be actuated while the fingers of said operator's left hand are positioned on said left-handed finger group of keys and wherein said left-handed integral palm rest is integrated with said left-handed tilted chordic keyboard such that the palm of said operator's left hand can rest on and be partially supported by said left-handed integral palm rest while the fingers of said operator's left hand are positioned on said left-handed finger group of keys and the thumb of said operator's left hand is positioned on said left-handed thumb group of keys and wherein said left-handed tilted chordic keyboard is tilted at an angle in the range of 20° to 45°;

means for detecting a plurality of right-handed chords produced by the actuation of said right-handed finger group of keys and said right-handed thumb group of keys;

means for detecting a plurality of left-handed chords produced by the actuation of said left-handed finger group of keys and said left-handed thumb group of keys;

means for transmitting said right-handed chords to said computer-based machine;

means for transmitting said left-handed chords to said computer-based machine; and means for programming said computer-based machine to receive said chords from said transmitting means, and to assign to each primary symbol of said primary symbol set a unique chord, said assignment to be derived using a correlation between a frequency-of-use index for each primary symbol and a composite chord-difficulty index of the unique chord such that when said computer-based machine is executing said programming means, said operator can communicate with said computer-based machine by actuating chords of keys on said tilted chordic keyboard.

3. A chordic keyboard system in a data processing apparatus, wherein the chordic keyboard system is used to communicate with a chordic keyboard including a plurality of keys, the chordic keyboard system comprising:

means for storing data representative of a plurality of chords, the data organized as a plurality of groups, wherein each chord corresponds to a subset of the plurality of keys of the chordic keyboard, and for storing a plurality of symbols, wherein data representative of a chord is represented by and corresponds to one of the plurality of symbols according to a correlation between a frequency-of-use index of the symbol and a composite chord-difficulty index of the chord, and wherein the plurality of groups includes an alphabetic group, a punctuation/cursor control group, an editing/control function group, a numerical/mathematical group, and a punctuation/symbolic-type group;

means for receiving data from the chordic keyboard identifying a selected chord of the plurality of chords;

means for identifying, using the stored data and symbols, the group corresponding to the selected chord, and for identifying a selected symbol of the plurality of symbols representative of the selected chord; and means, coupled to the identifying means, for generating a signal corresponding to the selected symbol.

4. The chordic keyboard system of claim 3 wherein the receiving means includes a means for recognizing that the data from the chordic keyboard corresponds to a depression of at least one of the plurality of keys of the chordic keyboard, wherein the keys are divided into a plurality of groups, including at least one of the following groups: a finger group and a thumb group, wherein the finger group includes a plurality of keys including an index-finger key, a middle-finger key, a ring-finger key, and a little-finger key, and wherein the thumb group includes a plurality of keys including a first thumb key, a second thumb key and a third thumb key.

5. The chordic keyboard system of claim 4 wherein the alphabetic group of the plurality of groups of chords corresponds to a combination of at least one of the second thumb key and a plurality of the finger group of keys.

6. The chordic keyboard system of claim 4 wherein the punctuation/cursor control group of the plurality of groups of chords corresponds to a combination of the first thumb key and at least one of the finger group of keys.

7. The chordic keyboard system of claim 4 wherein the editing/control function group of the plurality of groups of chords corresponds to a combination of the third thumb key and at least one of the finger group of keys.

8. The chordic keyboard system of claim 4 wherein the numerical/mathematical group of the plurality of groups of chords corresponds to a combination of the third thumb key followed by at least one of the second thumb key and a plurality of the finger group of keys.

9. The chordic keyboard system of claim 4 wherein the punctuation/symbolic-type group of the plurality of groups of chords corresponds to a combination of the third thumb key and the index-finger key followed by at least one of the second thumb key and a plurality of the finger group of keys.

10. The chordic keyboard system of claim 3 further comprising means for generating the data in the chordic keyboard identifying a selected chord of the plurality of chords.

11. The chordic keyboard system of claim 10 wherein the means for generating includes a right-hand generating means and a left-hand generating means, wherein the right-hand generating means and left-hand generating means independently generate data.

12. A chordic keyboard system in a data processing apparatus, wherein the chordic keyboard system communicates with a chordic keyboard in a plurality of modes, including a let-mode and a num-mode, wherein said chordic keyboard includes a plurality of keys, the chordic keyboard system comprising:

means for storing data representative of a plurality of chords, the data organized as a plurality of data groups, wherein each chord corresponds to a subset of the plurality of keys of the chordic keyboard, and for storing a plurality of symbols, wherein data representative of a chord is mapped to one of the plurality of symbols based on a correlation between a plurality of symbol-groups and a plurality of chord groups in which each of the symbols is assigned to one of the symbol-groups based on a frequency-of-use index of the symbol and each chord is assigned one of the chord groups based on a composite chord-difficulty index of the chord, wherein the composite chord-difficulty index includes both a motor difficulty index and a perceptual difficulty index corresponding to the chord, and wherein the plurality of data groups includes an alphabetic group, a punctuation/cursor control group, an editing/control function group, a numerical/mathematical group, and a punctuation/symbolic-type group;

means for receiving data from the chordic keyboard identifying a selected chord of the plurality of chords and for recognizing that the received data corresponds to a depression of the plurality of keys of the chordic keyboard, wherein the keys are divided into a plurality of groups, including at least one of the following groups: a finger group and a thumb group, wherein the finger group includes a plurality of keys including an index-finger key, a middle-finger key, a ring-finger key, and a little-finger key, and wherein the thumb group includes a plurality of keys including a first thumb key, a second thumb key and a third thumb key;

means for identifying, using the stored data and symbols, the group corresponding to the selected chord, and for identifying a selected symbol of the plurality of symbols representative of the selected chord; and means, coupled to the identifying means, for generating a signal corresponding to the selected symbol.

13. The chordic keyboard system of claim 12 wherein the plurality of symbols includes data representative of the following characters: a, b, c, d, e, f, g, h, i, j, k, l, m, n, o, p, q, r, s, t, u, v, w, x, y, z, and a character representative of a blank space.

14. The chordic keyboard system of claim 13 wherein an operator operates the chordic keyboard, and wherein the receiving means includes means for receiving, in the let-mode, data indicating that the operator has depressed the second thumb key, the index-finger key, the middle-finger key, and the ring-finger key to identify the selected chord, and wherein the identifying means includes means for identifying data representative of the character "a" as the selected symbol.

15. The chordic keyboard system of claim 14 wherein the identifying means further includes means for identifying data representative of the character "a" in the let mode as data representative of a mathematical operator "+" in the num mode and wherein the mathematical operator "+" corresponds to the mathematical function for addition.

16. The chordic keyboard system of claim 13 wherein an operator operates the chordic keyboard, and wherein the receiving means includes means for receiving, in the let-mode, data indicating that the operator has depressed the index-finger key and the little-finger key to identify the selected chord, and wherein the identifying means includes means for identifying data representative of the character "b" as the selected symbol.

17. The chordic keyboard system of claim 13 wherein an operator operates the chordic keyboard, and wherein the receiving means includes means for receiving, in the let-mode, data indicating that the operator has depressed the second thumb key and the middle-finger key to identify the selected chord, and wherein the identifying means includes means for identifying data representative of the character "c" as the selected symbol.

18. The chordic keyboard system of claim 13 wherein an operator operates the chordic keyboard, and wherein the receiving means includes means for receiving, in the let-mode, data indicating that the operator has depressed the second thumb key, the index-finger key and the middle-finger key to identify the selected chord, and wherein the identifying means includes means for identifying data representative of the character "d" as the selected symbol.

19. The chordic keyboard system of claim 18 wherein the identifying means further includes means for identifying data representative of the character "d" in the let mode as data representative of a mathematical operator "/" in the num mode and wherein the mathematical operator "/" corresponds to the mathematical function for division.

20. The chordic keyboard system of claim 13 wherein an operator operates the chordic keyboard, and wherein the receiving means includes means for receiving, in the let-mode, data indicating that the operator has depressed the index-finger key, the middle-finger key, and the ring-finger key to identify the selected chord, and wherein the identifying means includes means for identifying data representative of the character "e" as the selected symbol.

21. The chordic keyboard system of claim 20 wherein identifying means further includes means for identifying data representative of the character "e" in the let mode as data representative of a mathematical operator "=" in the num mode and wherein the mathematical operator "=" corresponds to the mathematical function for equals.

22. The chordic keyboard system of claim 13 wherein an operator operates the chordic keyboard, and wherein the receiving means includes means for receiving, in the let-mode, data indicating that the operator has depressed the second thumb key and the little-finger key to identify the selected chord, and wherein the identifying means includes means for identifying data representative of the character "f" as the selected symbol.

23. The chordic keyboard system of claim 13 wherein an operator operates the chordic keyboard, and wherein the receiving means includes means for receiving, in the let-mode, data indicating that the operator has depressed the second thumb key and the ring-finger key to identify the selected chord, and wherein the identifying means includes means for identifying data representative of the character "g" as the selected symbol.

24. The chordic keyboard system of claim 13 wherein an operator operates the chordic keyboard, and wherein the receiving means includes means for receiving, in the let-mode, data indicating that the operator has depressed the middle-finger key and the ring-finger key to identify the selected chord, and wherein the identifying means includes means for identifying data representative of the character "h" as the selected symbol.

25. The chordic keyboard system of claim 24 wherein the identifying means further includes means for identifying data representative of the character "h" in the let mode as data representative of a mathematical operator ">" in the num mode and wherein the mathematical operator ">" corresponds to the mathematical function for greater than.

26. The chordic keyboard system of claim 13 wherein an operator operates the chordic keyboard, and wherein the receiving means includes means for receiving, in the let-mode, data indicating that the operator has depressed the index-finger key to identify the selected chord, and wherein the identifying means includes means for identifying data representative of the character "i" as the selected symbol.

27. The chordic keyboard system of claim 13 wherein an operator operates the chordic keyboard, and wherein the receiving means includes means for receiving, in the let-mode, data indicating that the operator has depressed the second thumb key, the index-finger key, and the ring-finger key to identify the selected chord, and wherein the identifying means includes means for identifying data representative of the character "j" as the selected symbol.

28. The chordic keyboard system of claim 13 wherein an operator operates the chordic keyboard, and wherein the receiving means includes means for receiving, in the let-mode, data indicating that the operator has depressed the index-finger key and the ring-finger key to identify the selected chord, and wherein the identifying means includes means for identifying data representative of the character "k" as the selected symbol.

29. The chordic keyboard system of claim 13 wherein an operator operates the chordic keyboard, and wherein the receiving means includes means for receiving, in the let-mode, data indicating that the operator has depressed the second thumb key and the index-finger key to identify the selected chord, and wherein the identifying means includes means for identifying data representative of the character "l" as the selected symbol.

30. The chordic keyboard system of claim 13 wherein an operator operates the chordic keyboard, and wherein the receiving means includes means for receiving, in the let-mode, data indicating that the operator has depressed the second thumb key, the index-finger key, and the middle-finger key to identify the selected chord, and wherein the identifying means includes means for identifying data representative of the character "m" as the selected symbol.

31. The chordic keyboard system of claim 30 wherein the identifying means further includes means for identifying data representative of the character "m" in the let mode as data representative of a mathematical operator "*" in the num mode and wherein the mathematical operator "*" corresponds to the mathematical function for multiplication.

32. The chordic keyboard system of claim 13 wherein an operator operates the chordic keyboard, and wherein the receiving means includes means for receiving, in the let-mode, data indicating that the operator has depressed the second thumb key, the middle-finger key, the ring-finger key, and the little-finger key to identify the selected chord, and wherein the identifying means includes means for identifying data representative of the character "n" as the selected symbol.

33. The chordic keyboard system of claim 13 wherein an operator operates the chordic keyboard, and wherein the receiving means includes means for receiving, in the let-mode, data indicating that the operator has depressed the second thumb key, the index-finger key, the middle-finger key, the ring-finger key, and little-finger key to identify the selected chord, and wherein the identifying means includes means for identifying data representative of the character "o" as the selected symbol.

34. The chordic keyboard system of claim 13 wherein an operator operates the chordic keyboard, and wherein the receiving means includes means for receiving, in the let-mode, data indicating that the operator has depressed the second thumb key, the middle-finger key, and the ring-finger key to identify the selected chord, and wherein the identifying means includes means for identifying data representative of the character "p" as the selected symbol.

35. The chordic keyboard system of claim 34 wherein the identifying means further includes means for identifying data representative of the character "p" in the let mode as data representative of a mathematical operator "%" in the num mode and wherein the mathematical operator "%" corresponds to the mathematical function for percentage.

36. The chordic keyboard system of claim 13 wherein an operator operates the chordic keyboard, and wherein the receiving means includes means for receiving, in the let-mode, data indicating that the operator has depressed the second thumb key, the index-finger key, the ring-finger key, and little-finger key to identify the selected chord, and wherein the identifying means includes means for identifying data representative of the character "q" as the selected symbol.

37. The chordic keyboard system of claim 13 wherein an operator operates the chordic keyboard, and wherein the receiving means includes means for receiving, in the let-mode, data indicating that the operator has depressed the middle-finger key to identify the selected chord, and wherein the identifying means includes means for identifying data representative of the character "r" as the selected symbol.

38. The chordic keyboard system of claim 13 wherein an operator operates the chordic keyboard, and wherein the receiving means includes means for receiving, in the let-mode, data indicating that the operator has depressed the middle-finger key, the ring-finger key, and the little-finger key to identify the selected chord, and wherein the identifying means includes means for identifying data representative of the character "s" as the selected symbol.

39. The chordic keyboard system of claim 38 wherein the identifying means further includes means for identifying data representative of the character "s" in the let mode as data representative of a mathematical operator "-" in the num mode and wherein the mathematical operator "-" corresponds to the mathematical function for subtraction.

40. The chordic keyboard system of claim 13 wherein an operator operates the chordic keyboard, and wherein the receiving means includes means for receiving, in the let-mode, data indicating that the operator has depressed the index-finger key, the middle-finger key, the ring-finger key, and the little-finger key to identify the selected chord, and wherein the identifying means includes means for identifying data representative of the character "t" as the selected symbol.

41. The chordic keyboard system of claim 13 wherein an operator operates the chordic keyboard, and wherein the receiving means includes means for receiving, in the let-mode, data indicating that the operator has depressed the ring-finger key and the little-finger key to identify the selected chord, and wherein the identifying means includes means for identifying data representative of the character "u" as the selected symbol.

42. The chordic keyboard system of claim 13 wherein an operator operates the chordic keyboard, and wherein the receiving means includes means for receiving, in the let-mode, data indicating that the operator has depressed the second thumb key, the ring-finger key, and the little-finger key to identify the selected chord, and wherein the identifying means includes means for identifying data representative of the character "v" as the selected symbol.

43. The chordic keyboard system of claim 13 wherein an operator operates the chordic keyboard, and wherein the receiving means includes means for receiving, in the let-mode, data indicating that the operator has depressed the little-finger key to identify the selected chord, and wherein the identifying means includes means for identifying data representative of the character "w" as the selected symbol.

44. The chordic keyboard system of claim 13 wherein an operator operates the chordic keyboard, and wherein the receiving means includes means for receiving, in the let-mode, data indicating that the operator has depressed the second thumb key, the index-finger key, and the little-finger key to identify the selected chord, and wherein the identifying means includes means for identifying data representative of the character "x" as the selected symbol.

45. The chordic keyboard system of claim 13 wherein an operator operates the chordic keyboard, and wherein the receiving means includes means for receiving, in the let-mode, data indicating that the operator has depressed the middle-finger key to identify the selected chord, and wherein the identifying means includes means for identifying data representative of the character "y" as the selected symbol.

46. The chordic keyboard system of claim 13 wherein an operator operates the chordic keyboard, and wherein the receiving means includes means for receiving, in the let-mode, data indicating that the operator has depressed the index-finger key, the ring-finger key, and the little-finger key to identify the selected chord, and wherein the identifying means includes means for identifying data representative of the character "z" as the selected symbol.

47. The chordic keyboard system of claim 46 wherein the identifying means further includes means for identifying data representative of the character "z" in the let mode as data representative of a mathematical operator "<" in the num-mode and wherein the mathematical operator "<" corresponds to the mathematical function for less than.

48. The chordic keyboard system of claim 13 wherein an operator operates the chordic keyboard, and wherein the receiving means includes means for receiving, in the let-mode, data indicating that the operator has depressed the second thumb key, the index-finger key, the middle-finger key, and the ring-finger key to identify the selected chord, and wherein the identifying means includes means for identifying data representative of the blank space as the selected symbol.

49. The chordic keyboard system of claim 12 wherein the plurality of symbols includes mode symbols corresponding to the plurality of modes, and wherein the identifying means identifies a selected mode symbol representative of the selected chord, and wherein the generating means generates a mode selection signal corresponding to the selected mode symbol to change a current mode to the mode corresponding to the selected mode symbol.

50. The chordic keyboard system of claim 49 wherein a num-mode symbol corresponds to the num-mode, and an operator operates the chordic keyboard and wherein when, the receiving means receives data indicating that the operator has depressed the third thumb key to identify the selected chord, the identifying means identifies a symbol representative of the num-mode as the selected mode symbol.

51. The chordic keyboard system of claim 12 wherein the plurality of symbols includes data representative of the following numerals and mathematical/logical operators: 1, 2, 3, 4, 5, 6, 7, 8, 9, 0, +, *, -, /, %, #, =, >, <, $, and a blank space.

52. The chordic keyboard system of claim 51 wherein an operator operates the chordic keyboard, and wherein the receiving means includes means for receiving, in the num-mode, data indicating that the operator has depressed the second thumb key to identify the selected chord, and wherein the identifying means includes means for identifying data representative of the numeral "1" as the selected symbol.

53. The chordic keyboard system of claim 51 wherein an operator operates the chordic keyboard, and wherein the receiving means includes means for receiving, in the num-mode, data indicating that the operator has depressed the index-finger key to identify the selected chord, and wherein the identifying means includes means for identifying data representative of the numeral "2" as the selected symbol.

54. The chordic keyboard system of claim 51 wherein an operator operates the chordic keyboard, and wherein the receiving means includes means for receiving, in the num-mode, data indicating that the operator has depressed the middle-finger key to identify the selected chord, and wherein the identifying means includes means for identifying data representative of the numeral "3" as the selected symbol.

55. The chordic keyboard system of claim 51 wherein an operator operates the chordic keyboard, and wherein the receiving means includes means for receiving, in the num-mode, data indicating that the operator has depressed the ring-finger key to identify the selected chord, and wherein the identifying means includes means for identifying data representative of the character representative of the numeral "4" as the selected symbol.

56. The chordic keyboard system of claim 51 wherein an operator operates the chordic keyboard, and wherein the receiving means includes means for receiving, in the num-mode, data indicating that the operator has depressed the little-finger key to identify the selected chord, and wherein the identifying means includes means for identifying data representative of the numeral "5" as the selected symbol.

57. The chordic keyboard system of claim 51 wherein an operator operates the chordic keyboard, and wherein the receiving means includes means for receiving, in the num-mode, data indicating that the operator has depressed the second thumb key and the index-finger key to identify the selected chord, and wherein the identifying means includes means for identifying data representative of the numeral "6" as the selected symbol.

58. The chordic keyboard system of claim 51 wherein an operator operates the chordic keyboard, and wherein the receiving means includes means for receiving, in the num-mode, data indicating that the operator has depressed the second thumb key and the middle-finger key to identify the selected chord, and wherein the identifying means includes means for identifying data representative of the numeral "7" as the selected symbol.

59. The chordic keyboard system of claim 51 wherein an operator operates the chordic keyboard, and wherein the receiving means includes means for receiving, in the num-mode, data indicating that the operator has depressed the second thumb key and the ring-finger key to identify the selected chord, and wherein the identifying means includes means for identifying data representative of the numeral "8" as the selected symbol.

60. The chordic keyboard system of claim 51 wherein an operator operates the chordic keyboard, and wherein the receiving means includes means for receiving, in the num-mode, data indicating that the operator has depressed the second thumb key and the little-finger key to identify the selected chord, and wherein the identifying means includes means for identifying data representative of the numeral "9" as the selected symbol.

61. The chordic keyboard system of claim 51 wherein an operator operates the chordic keyboard, and wherein the receiving means includes means for receiving, in the num-mode, data indicating that the operator has depressed the second thumb key, the index-finger key, the middle-finger key, the ring-finger key, and the little-finger key to identify the selected chord, and wherein the identifying means includes means for identifying data representative of the numeral "0" as the selected symbol.

62. The chordic keyboard system of claim 51 wherein an operator operates the chordic keyboard, and wherein the receiving means includes means for receiving, in the num-mode, data indicating that the operator has depressed the second thumb key, index-finger key, middle-finger key, and ring-finger key to identify the selected chord, and the identifying means includes means for identifying data representative of the mathematical/logical operator "+" as the selected symbol, wherein the mathematical/logical operator "+" corresponds to the mathematical function for addition.

63. The chordic keyboard system of claim 51 wherein the identifying means further includes means for identifying data representative of the character "a" in the let-mode as data representative of the mathematical/logical operator "+" as the selected symbol in the num-mode, wherein the mathematical/logical operator "+" corresponds to the mathematical function for addition.

64. The chordic keyboard system of claim 51 wherein an operator operates the chordic keyboard, and wherein the receiving means includes means for receiving, in the num-mode, data indicating that the operator has depressed the second thumb key, index-finger key, and middle-finger key to identify the selected chord, and the identifying means includes means for identifying data representative of the mathematical/logical operator "*" as the selected symbol, wherein the mathematical/logical operator "*" corresponds to the mathematical function for multiplication.

65. The chordic keyboard system of claim 51 wherein the identifying means further includes means for identifying data representative of the character "m" in the let-mode as data representative of the mathematical/logical operator "*" as the selected symbol in the num-mode, wherein the mathematical/logical operator "*" corresponds to the mathematical function for multiplication.

66. The chordic keyboard system of claim 51 wherein an operator operates the chordic keyboard, and wherein the receiving means includes means for receiving, in the num-mode, data indicating that the operator has depressed the middle-finger key, ring-finger key, and little-finger key to identify the selected chord, and the identifying means includes means for identifying data representative of the mathematical/logical operator "-" as the selected symbol, wherein the mathematical/logical operator "-" corresponds to the mathematical function for subtraction.

67. The chordic keyboard system of claim 51 wherein the identifying means further includes means for identifying data representative of the character "s" in the let-mode as data representative of the mathematical/logical operator "-" as the selected symbol in the num-mode, wherein the mathematical/logical operator "-" corresponds to the mathematical function for subtraction.

68. The chordic keyboard system of claim 51 wherein an operator operates the chordic keyboard, and wherein the receiving means includes means for receiving, in the num-mode, data indicating that the operator has depressed the index-finger key and the middle-finger key to identify the selected chord, and the identifying means includes means for identifying data representative of the mathematical/logical operator "/" as the selected symbol, wherein the mathematical/logical operator "/" corresponds to the mathematical function for division signal corresponding to the selected symbol.

69. The chordic keyboard system of claim 51 wherein the identifying means further includes means for identifying data representative of the character "d" in the let-mode as data representative of the mathematical/logical operator "/" as the selected symbol in the num-mode, wherein the mathematical/logical operator "/" corresponds to the mathematical function for division.

70. The chordic keyboard system of claim 51 wherein an operator operates the chordic keyboard, and wherein the receiving means includes means for receiving, in the num-mode, data indicating that the operator has depressed the second thumb key, the middle-finger key, and the ring-finger key to identify the selected chord, and the identifying means includes means for identifying data representative of the mathematical/logical operator "%" as the selected symbol, wherein the mathematical/logical operator "%" corresponds to the mathematical function for percentage.

71. The chordic keyboard system of claim 51 wherein the identifying means further includes means for identifying data representative of the character "p" in the let-mode as data representative of the mathematical/logical operator "%" as the selected symbol in the num-mode, wherein the mathematical/logical operator "%" corresponds to the mathematical function for percentage.

72. The chordic keyboard system of claim 51 wherein an operator operates the chordic keyboard, and wherein the receiving means includes means for receiving, in the num-mode, data indicating that the operator has depressed the second thumb key, the middle-finger key, the ring-finger key, and the little-finger key to identify the selected chord, and the identifying means includes means for identifying data representative of the mathematical/logical operator "#" as the selected symbol.

73. The chordic keyboard system of claim 51 wherein the identifying means further includes means for identifying data representative of the character "n" in the let-mode as data representative of the mathematical/logical operator "#" as the selected symbol in the num-mode.

74. The chordic keyboard system of claim 51 wherein an operator operates the chordic keyboard, and wherein the receiving means includes means for receiving, in the num-mode, data indicating that the operator has depressed the index-finger key, the middle-finger key, and the ring-finger key to identify the selected chord, and the identifying means includes means for identifying data representative of the mathematical/logical operator "=" as the selected symbol, wherein the mathematical/logical operator "=" corresponds to the mathematical function for equals.

75. The chordic keyboard system of claim 51 wherein the identifying means further includes means for identifying data representative of the character "e" in the let-mode as data representative of the mathematical/logical operator "=" as the selected symbol in the num-mode, wherein the mathematical/logical operator "=" corresponds to the mathematical function for equals.

76. The chordic keyboard system of claim 51 wherein an operator operates the chordic keyboard, and wherein the receiving means includes means for receiving, in the num-mode, data indicating that the operator has depressed the middle-finger key and the ring-finger key to identify the selected chord, and the identifying means includes means for identifying data representative of the mathematical/logical operator ">" as the selected symbol, wherein the mathematical/logical operator ">" corresponds to the logical function for greater than.

77. The chordic keyboard system of claim 51 wherein the identifying means further includes means for identifying data representative of the character "h" in the let-mode as data representative of the mathematical/logical operator ">" as the selected symbol in the num-mode, wherein the mathematical/logical operator ">" corresponds to the logical function for greater than.

78. The chordic keyboard system of claim 51 wherein an operator operates the chordic keyboard, and wherein the receiving means includes means for receiving, in the num-mode, data indicating that the operator has depressed the index-finger key, the ring-finger key, and the little-finger key to identify the selected chord, and the identifying means includes means for identifying data representative of the mathematical/logical operator "<" as the selected symbol, wherein the mathematical/logical operator "<" corresponds to the logical function for less than.

79. The chordic keyboard system of claim 51 wherein the identifying means further includes means for identifying data representative of the character "z" in the let-mode as data representative of the mathematical/logical operator "<" as the selected symbol in the num-mode, wherein the mathematical/logical operator "<" corresponds to the logical function for less than.

80. The chordic keyboard system of claim 51 wherein an operator operates the chordic keyboard, and wherein the receiving means includes means for receiving, in the num-mode, data indicating that the operator has depressed the ring-finger key and the little-finger key to identify the selected chord, and the identifying means includes means for identifying data representative of the mathematical/logical operator "$" as the selected symbol.

81. The chordic keyboard system of claim 51 wherein the identifying means further includes means for identifying data representative of the character "u" in the let-mode as data representative of the mathematical/logical operator "$" as the selected symbol in the num-mode.

82. The chordic keyboard system of claim 51 wherein an operator operates the chordic keyboard, and wherein the receiving means includes means for receiving, in the num-mode, data indicating that the operator has depressed the index-finger key and the little-finger key to identify the selected chord, and the identifying means includes means for identifying data representative of the mathematical/logical operator for the blank space.

83. The chordic keyboard system of claim 51 wherein the identifying means further includes means for identifying data representative of the character "b" in the let-mode as data representative of the mathematical/logical operator for the blank space as the selected symbol in the num-mode.

* * * * *

UNITED STATES PATENT AND TRADEMARK OFFICE
CERTIFICATE OF CORRECTION

PATENT NO. : 5,493,654
DATED : February 20, 1996
INVENTOR(S) : Gopher et al.

It is certified that error appears in the above-indentified patent and that said Letters Patent is hereby corrected as shown below:

Claim 4, col. 15, line 60, delete "," after "of".
Claim 68, col. 23, lines 33-34, delete "signal corresponding to the selected symbol".
Claim 80, col. 25, line 3, change " 'S°'" to --"S"--.
Col. 10, lines 52-53, change "Blue (shift) Thumb key, Index Finger Key, Forefinger Key and Middle Finger Key" to --Blue (shift) Thumb Key, Ring Finger Key, and Index Finger Key--.
Claim 2, col. 14, line 52, "an" should read --a--; col. 15, line 7, "right- handed" should read --right-handed--.
Claim 50, col. 21, line 20, delete "," after "when".
Col. 7, line 23, insert --the-- between "by" and "angle".
Col. 10, line 56, change "Index" to --Pinkie--.
Fig. 9, change the illustration corresponding to "B" to:

Signed and Sealed this

Fourth Day of February, 1997

Attest:

BRUCE LEHMAN

Attesting Officer

Commissioner of Patents and Trademarks